Jan. 17, 1950    O. S. FIELD ET AL    2,495,140
AIRPLANE APPROACH CONTROL SYSTEM

Filed May 7, 1945    7 Sheets-Sheet 1

Inventors
O. S. Field, S. N. Wight and R. W. Hewes
By Neil W. Preston,
their Attorney

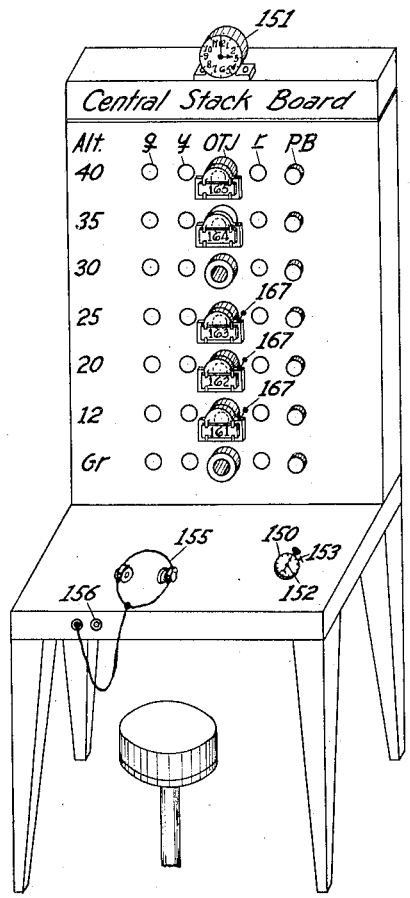
FIG. 3
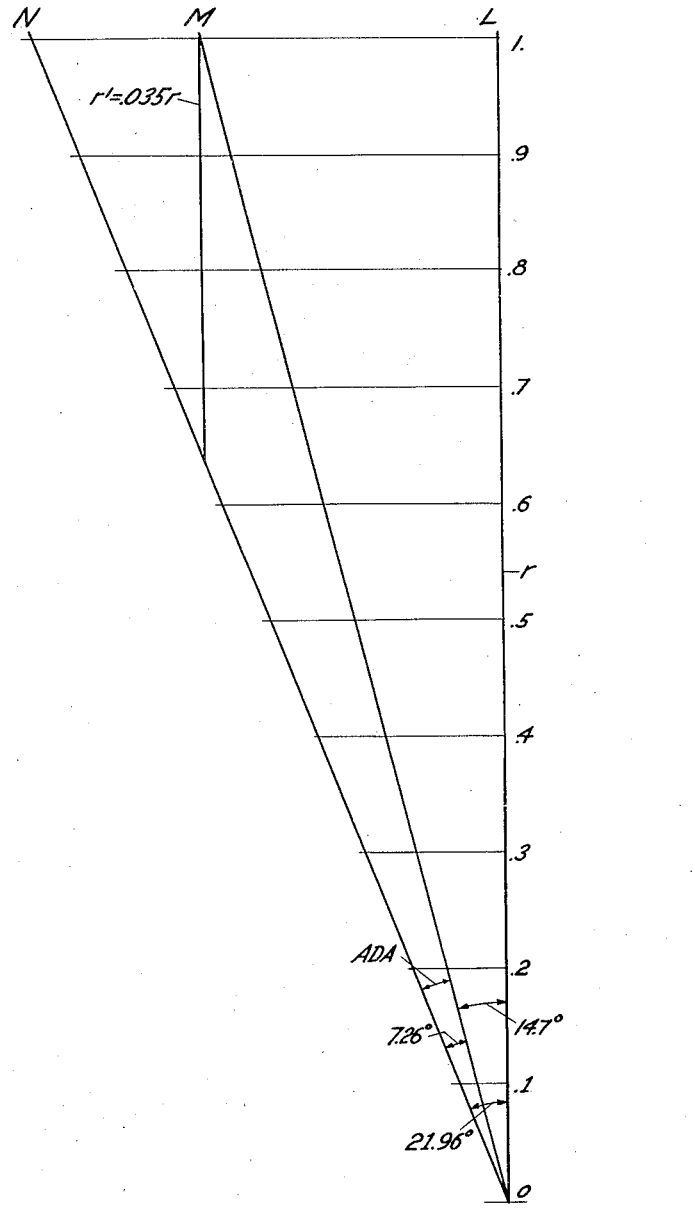
FIG. 6
FIG. 7
$\tan 14.7° = \frac{ML}{L}$
$\tan 21.96° = \frac{NL}{L}$
$ML = (\tan 14.7°) = 0.2617 L$
$NL = (\tan 21.96°) 0.4033 L$
$\frac{r'}{r} = \frac{NM}{NL} = \frac{NL - ML}{NL} = \frac{0.4033 L - .2617 L}{0.4033 L} = \frac{0.1416}{0.4033} = 0.35$
then $r' = 0.35 r$
Inventors
O. S. Field, S. N. Wight and R. W. Hewes
By Neil W. Preston,
their Attorney

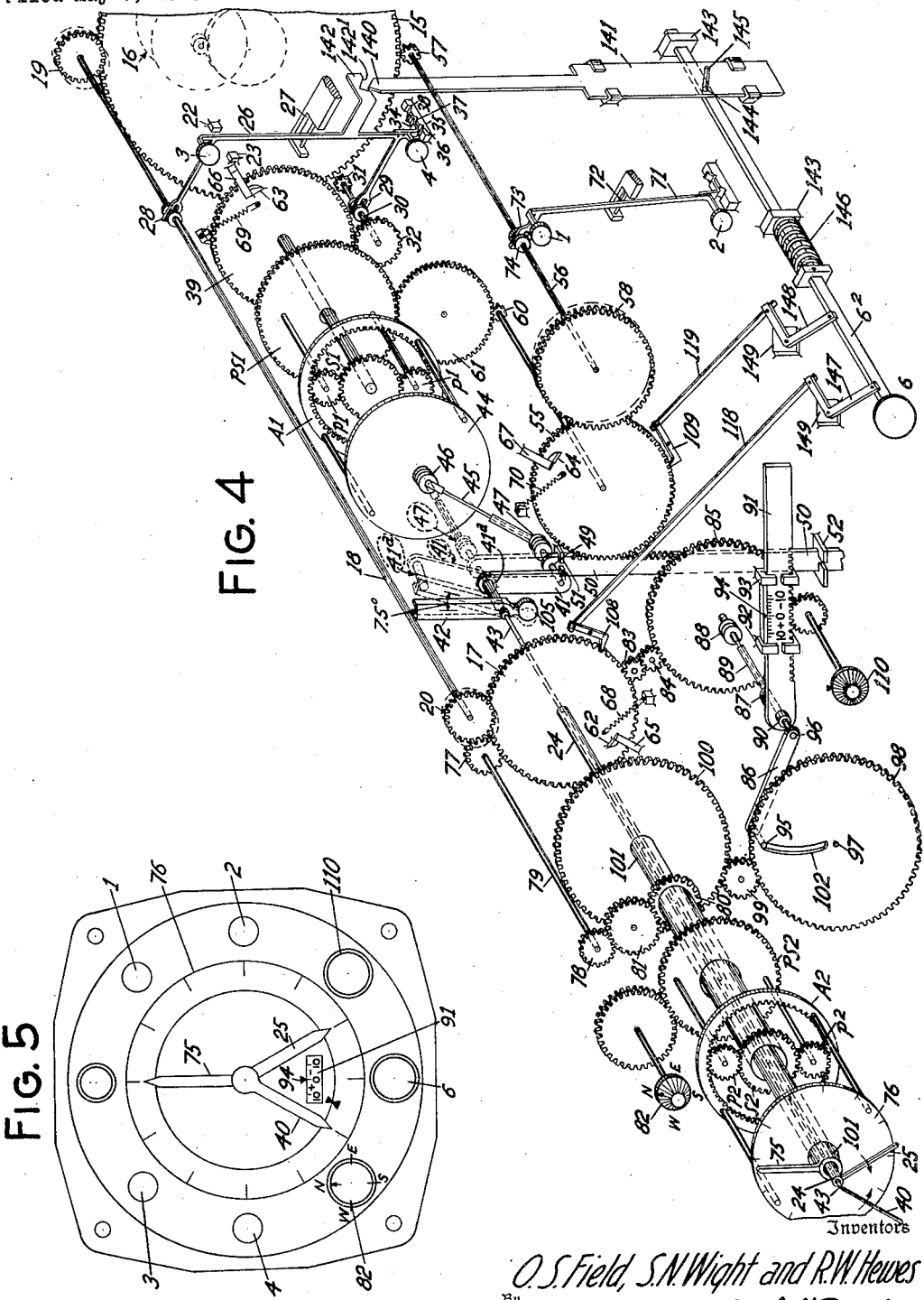

Jan. 17, 1950     O. S. FIELD ET AL     2,495,140
AIRPLANE APPROACH CONTROL SYSTEM
Filed May 7, 1945     7 Sheets-Sheet 4
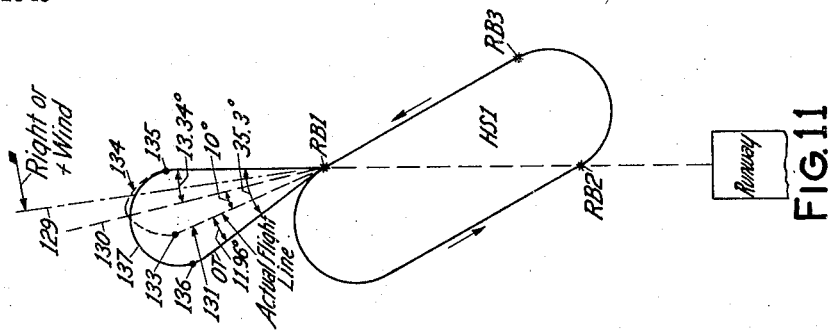
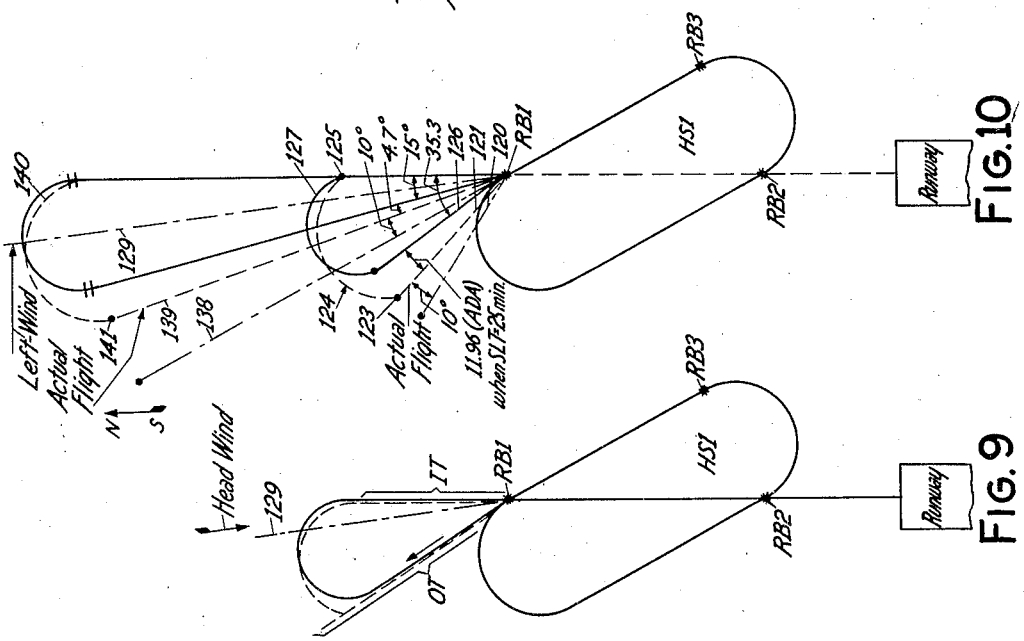
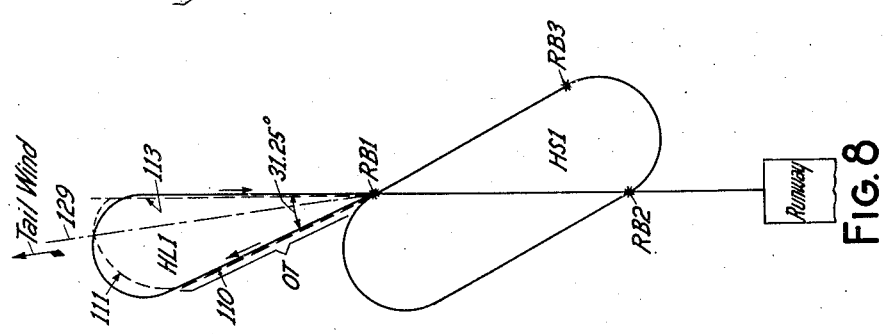
Inventors
O. S. Field, S. N. Wight and R. W. Hewes
By Neil W. Preston,
their Attorney Jan. 17, 1950

O. S. FIELD ET AL 2,495,140

AIRPLANE APPROACH CONTROL SYSTEM

Filed May 7, 1945

Inventors
O.S.Field, S.N.Wight and R.W.Hewes
By Neil W. Preston,
their Attorney

Jan. 17, 1950     O. S. FIELD ET AL     2,495,140
AIRPLANE APPROACH CONTROL SYSTEM
Filed May 7, 1945     7 Sheets-Sheet 6
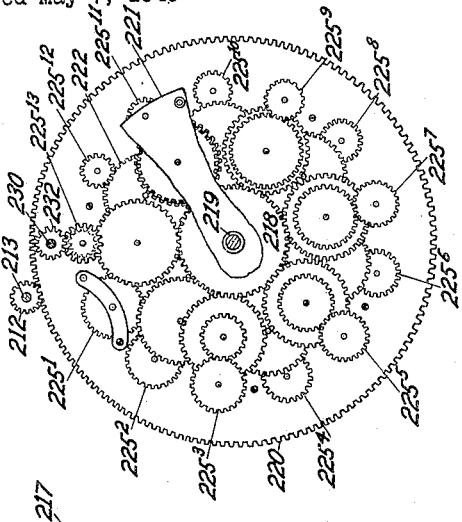
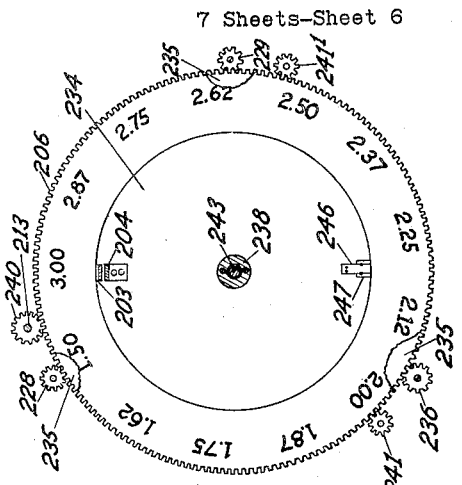
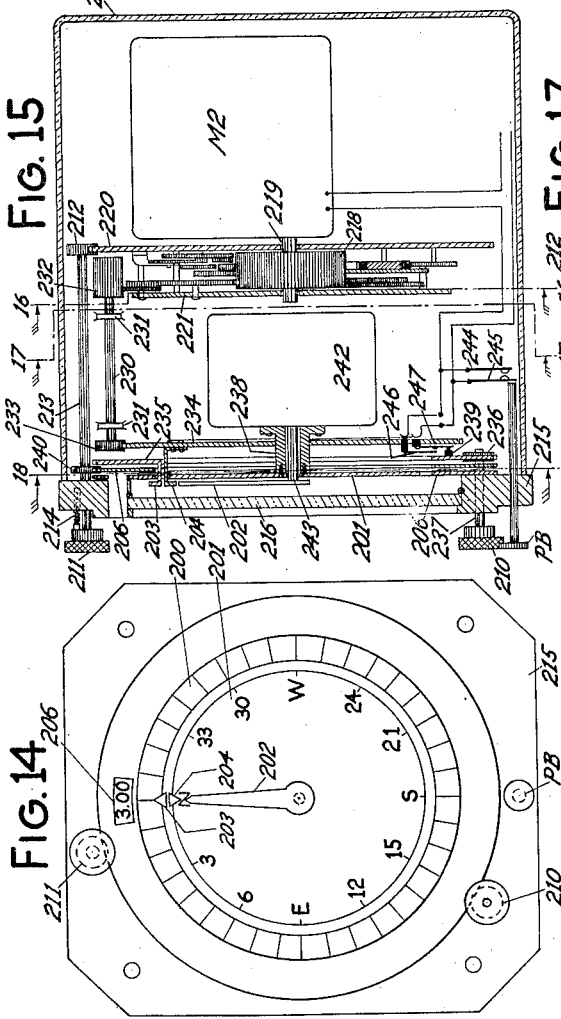
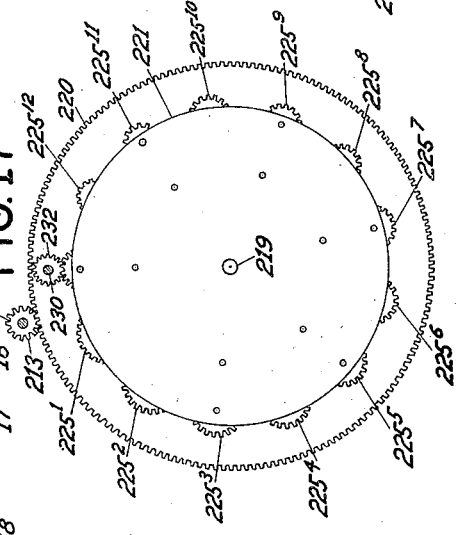
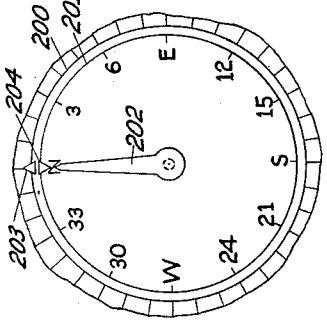
Inventors
O. S. Field, S. N. Wight and R. W. Hewes
Neil W. Preston,
their Attorney Jan. 17, 1950     O. S. FIELD ET AL     2,495,140
AIRPLANE APPROACH CONTROL SYSTEM Filed May 7, 1945     7 Sheets-Sheet 7

Inventors
O. S. Field, S. N. Wight and R. W. Hewes
By Neil W. Keston,
their Attorney Patented Jan. 17, 1950

2,495,140

UNITED STATES PATENT OFFICE 2,495,140

AIRPLANE APPROACH CONTROL SYSTEM

Oscar S. Field, Sedgwick N. Wight, and Ralph W. Hewes, Rochester, N. Y., assignors to General Railway Signal Company, Rochester, N. Y.

Application May 7, 1945, Serial No. 592,416

7 Claims. (Cl. 235—61)

This invention relates to computers or flight predictors which compute or predict approximately the time an airplane must consume in flying in a variable length storage or holding loop in order to get into position to land at a predetermined time; and is an improvement over the methods and apparatuses disclosed in the prior application of S. P. Saint, Ser. No. 569,335, filed December 22, 1944, and our prior application Ser. No. 573,876, filed January 22, 1945.

It has been the practice to store airplanes in one or more storage stacks near an airport, each airplane being assigned to fly in its particular assigned altitude, and to then cause these airplanes to be landed one at a time either directly from the altitude it first occupied or after it has been laddered down to one of the lower altitudes. By reason of the fact that the operator or dispatcher who instructs the initiation of a landing maneuver of an airplane from a storage stack does not know, at least under poor visibility, in what part of the flight path in his altibility, in what part of the flight path in his altitude in the stack the airplane is flying at the time the pilot is called to start a landing it was necessary in earlier landing methods for the dispatcher to allow sufficient time between successive calling of airplanes from the holding stack to guard against any possible collision between two airplanes, and it is this unnecessary long-time spacing between airplanes that is to be avoided by the use of the computer and associated apparatus embodying the present invention.

In accordance with the present invention it is proposed to provide a computer which computes and defines automatically in accordance with the manual manipulation of push buttons on each airplane as to what form of flying pattern the pilot shall fly, the push buttons of which are preferably operated by the pilot of such airplane. In the prior applications above referred to a similar computer, when employed, was located in an office or tower on the ground and was manipulated by the operator at such office and not by the pilot of the airplane under consideration.

In accordance with one form of the present invention it is proposed to construct the computer so that it will compute the angle at which an airplane heads into a holding loop which angle is not only dependent upon the maneuver time consumed in the holding stack but is also dependent upon the side wind or drift angle of the airplane and also the prevailing head or tail wind.

Another object of the present invention resides in the provision of means incorporated within the computer whereby the drift angle as observed by the pilot may be made manifest in the computer by the adjustment of a suitable drift angle knob.

In accordance with another object of the present invention it is proposed to semi-automatically set up in the computer the ground speed at which the airplane is travelling dependent in part on head and tail wind as determined by a timing device manipulated distinctively by the pilot as he enters and leaves a straight line portion of the holding loop to thereby make manifest in the computer the ground speed of the airplane carried computer.

In accordance with another object of the present invention it is proposed to compute the out-time (the time consumed between the leaving of the holding stack and the making of a procedural turn) automatically dependent upon the ground speed made manifest in the computer, that is, it is proposed to automatically compensate for variations in head winds and tail winds.

Another object of the present invention resides, if desired, in the provision of a control board, tokens, token jacks and indicating lamps for the operator at a ground location near the airfield (and a monitor if desired) together with push buttons for the operator for indicating the progress of the laddering down of airplanes in the holding stack, it being proposed to provide a special token carried indicator for indicating whether or not the airplane represented by such token has or has not been instructed to make a landing maneuver, the apparatus for the monitor having been disclosed in our said prior application.

Another feature of the present invention resides in the provision of timing means, such as a stop watch, for the operator or the pilot to enable him to call airplanes for landing maneuvers at predetermined spaced time intervals.

In accordance with a modified form of the invention it is proposed to provide a holding stack and holding loop circular in form and to employ a computer or director to advise the pilot how to steer his airplane to fly a circle of such curvature as to consume the proper amount of time during the flying of one revolution in such loop. This feature herein disclosed in Figs. 14 to 22 and appropriately described in this specification, and any other subject matter of the corresponding portions of this disclosure, is disclosed and claimed in our divisional application Ser. No. 98,212, filed June 10, 1949.

In accordance with another form of the invention part of the computing apparatus may be located on the airplane and part of such apparatus may be located in a ground located office.

One form of the invention not only lends itself to the landing of an airplane on a ground located landing strip but also to the landing of airplanes on an airplane carrier.

Other objects, purposes and characteristic features of the present invention will in part be understood from the following specification and will in part be obvious from the accompanying drawings, in which:

Fig. 3 illustrates a control board provided with indicating lamps, push buttons and token jacks similar to the control board employed in our prior application, Ser. No. 673,876;

Fig. 4 illustrates an exploded isometric view of one form of airplane carried computer embodying the present invention;

Fig. 5 illustrates a front view of the computer illustrated in Fig. 4;

Figs. 6 and 7 illustrate triangle computations for determining the construction of that portion of the computer which computes drift angle modifications dependent on stack-loss time consummation;

Figs. 8, 9, 10 and 11 illustrate flying patterns under tail wind, head wind, left wind and right wind conditions respectively;

Figs. 14–19 illustrate a modified form of computer which may be located entirely on the airplane or, if desired, may be located partly on such airplane and partly in a ground located office, in that the stop watch shown in Fig. 19 may be located either on the airplane or on the ground;

Figure 1:
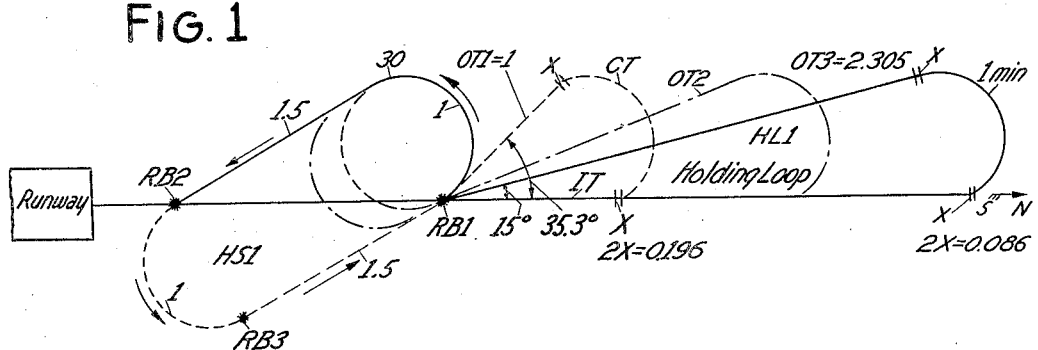
Fig. 1 illustrates a portion of the flying field including a runway and two radio beacons or aeroplanes defining the flying pattern for the holding stack and showing the flying pattern of holding loops of various shapes and dimensions.

*Holding stack and holding loop.*—By referring to Fig. 1 it will be observed that the two radio beacons or aerophares RB1 and RB2, which are preferably of a construction more fully described hereinafter, are lined up with the glide path for landing airplanes on a runway, and that a third aerophare RB3, more particularly for automatic direction finding purposes, is also provided. This is not a necessary requirement in that radio beacons RB1 and RB2 need not be lined up with the runway in that the runway could be located a considerable distance away and need not be in a line with these beacons, but it is, however, preferably of a construction such as illustrated. From a point above each of these radio beacons RB1 and RB2, and also RB3 if used, the flying path of the storage stack consists of a left-hand semi-circular turn started from beacon RB1 or RB2, which path upon completion of this turn runs directly into the other radio beacon. In other words, these two radio beacons RB1 and RB2 define a flying path in a holding stack which has one-minute semi-circular turns the ends of which are joined by straight lines each preferably 1.5 minute flying distance in length. The third radio beacon is of course also useful in defining the holding stack. These distances are expressed in minutes on the assumption that an airplane travels at, say 135 M. P. H. under no-wind conditions, and from these time values the actual distances can, if desired, be readily calculated. Airplanes fly in this holding stack path in directions as indicated by the arrows. These radio beacons RB1, RB2, etc. are of a construction more fully described in the above referred to prior applications and each beacon is preferably tuned and delivers its distinctive carrier frequency so that if multiple ADF instruments are employed each instrument may be tuned to point at a particular radio beacon. These beacons usually have a cone of silence directly above them in which may be emitted a distinctive frequency directional radio beam.

If an airplane is called from this holding stack HS1 for the purpose of consuming a variable amount of time in a holding loop such as HL1, depending on his location in the holding stack when he was called, he will if he is flying directly toward beacon RB2 immediately proceed to make a left-hand one-minute semi-circular turn. If the airplane is located directly over the radio beacon RB2 at the time he is called the time consumed in the stack, conveniently called the stack-loss time, will be one minute consumed during the semi-circular turn from beacon RB2 to beacon RB3, and 1.5 minutes consumed during the straight run from beacon RB3 to beacon RB1 making a stack-loss time of 2.5 minutes, which is the maximum stack-loss time under no-wind conditions. If he is anywhere between beacons RB3 and RB1, when called for a landing maneuver, he will proceed directly into the holding loop HL1. The holding-loop path is conveniently divided into five parts consisting of a straight run or out-time OT, a circling distance X, a one-minute semi-circular turn CT, another distance X, and an in-time IT. Since the out-time OT and the in-time IT are under no-wind condition the same in length (expressed in time) each of a length to consume one minute (for minimum loop) the total time to be consumed in the minimum holding loop, illustrated by dotted lines in Fig. 1, may be readily determined by calculating the two distances X, which are equal, and by adding thereto the out-time OT of one minute, the in-time IT of one minute and the semi-circle time CT of one minute. This calculation of the distance X for minimum out-time, expressed in minutes, can readily be shown for the dotted holding loop to amount to 0.098 minute so that 2X is a distance of 0.196 minute flying distance. The distance X may be calculated as follows: the tangent of the angle X about the center of the circle is the radius divided by OT or 0.318/1 for the minimum out-time of 1, so that the angle is 17° 40' and expressed in radians is 0.3083. Multiplying this value by the radius (0.318) we have .098 for X or 2X=0.196 minute.

By referring to Fig. 1 it will readily be seen that if the stack-loss time is known the holding-loop time can be determined by subtracting the stack-loss time from the total time. It is also readily seen that if the semi-circle time CT of one minute is left out of the computer and since the out-time OT is equal to the in-time IT it would only be necessary to divide 2OT+2X by 2. Since, however, the variable part of 2X varies inversely with the value of 2OT it can readily be seen that if 2OT is divided by a number slightly smaller than 2 the changing value of 2X may readily be compensated for.

By again referring to Fig. 1 and the above calculation of X it is readily seen that for a maximum stack-loss time SLT of 2.5 minutes the out-time OT and the in-time IT will each be one minute and under this condition the value of 2X will be 0.196 minute and the semi-circle time will be one minute. Summing these values up it is readily seen that the total time to be consumed between the calling of an airplane from the holding stack and the time of passing of this airplane over the beacon RB1 when leaving the holding loop will be 5.696 minutes. It is also readily seen that for a minimum stack-loss time SLT (zero) the value of 2X, conveniently called the unvariable portion thereof, will be 0.086 and then the out-time OT will be $$\frac{5.696-1-0.086}{2}$$

or 2.305. It should now be remembered that the purpose of the computer is to compute approximately the heading angle and the out-time OT under various conditions.

It is readily seen that if the quantity 2X heretofore mentioned were not a factor and if the semi-circle time CT of one minute were omitted from the computer, leaving 4.5 minutes in the computer, it would only be necessary to divide by two, that is, having a timing means run at double speed, after the stack-loss time has been deducted to obtain the out-time. Let us assume for the moment that the portion 2X is disregarded and that the speed of the timing means which is operated when the pilot leaves the holding stack HS1 is double that of the timing means operating when the airplane is still in the holding stack. Let us also assume that the operator calls an airplane from the stack HS1 of Fig. 1 when it flies directly over the beacon RB2 and that the pilot at this time starts the stack-loss timing means. From this it will be seen that when the airplane passes over beacon RB1 a time of 2.5 minutes will have been consumed. As the pilot passes over the beacon RB1 he will depress the push button 3 (see Fig. 4) to thereby cause a timing means to operate at say double speed so that it will grind out, so to speak, the out-time OT and the in-time IT simultaneously. Under this condition the total time in the computer would be 4.5 minutes and the out-time OT would be 1 minute.

This computer illustrated in Fig. 4, however, has a total time of 4.4157 minutes for reasons hereinafter pointed out. It is thus seen that under the assumptions just made the timing means (pointer 25 in the Fig. 4 structure) will grind out, so to speak, the stack-loss time and the timing means (pointer 40 in the Fig. 4 structure) will operate at substantially twice that speed and will simultaneously grind out both the out-time OT and the in-time IT. Let us now determine what the speed of the pointer 40 should be instead of the double speed above assumed, to as nearly as possible give consideration to variations in the value of 2X which were disregarded in the above discussion.

As above pointed out for maximum stack-loss time of 2.5 minutes the value of each of OT and IT is one. The value of 2X is 0.196 and the circle time is 1 so that the total time is 5.696. Also, if the stack-loss time is a minimum, namely, 0, then 2X equals 0.086 and OT equals $$\frac{5.696-1.0-0.086}{2}$$

for 2.305. If we now take the circle time CT, since it is a constant, from this total time the total time of the maneuver will be 4.696 but this is not the total time built into the flight predictor, computer or calculator, for the simple reason that the variable part of 2X varies substantially inversely with the value of OT, that is, as OT increases the variable part of 2X decreases, and consideration must be given to the variable portion of 2X. Since we want to use a lower speed ratio than 2 to 1 for the second speed to the first speed of timing devices, to compensate for variation in 2X we must reduce the total time by a constant which we will call K. If we now consider $g$ to be the speed ratio of the speed of pointer 40 to that of the pointer 25 we may write out the following equation:

$$OT=\frac{4.5-K-SLT}{g}$$

where 4.5 is the total time in the computer when 2X is disregarded, SLT is the stack-loss time, K is a constant brought into the computer in order to give consideration to the value of 2X, and $g$ is the desired speed ratio of pointer 40 to pointer 25, to give consideration to this value 2X. In order to determine the approximate values of K and $g$ we may assume the two extreme limits; first, maximum stack-loss time SLT and one minute out-time OT and then the other limit of zero stack-loss time SLT and maximum out-time OT of 2.305. Substituting these values in the equation above we have $$1=\frac{4.5-K-2.5}{g}$$

for the first set of values mentioned and we have $$2.305=\frac{4.5-K}{g}$$

for the second set of values where the stack-loss time is zero. Solving these equations for $g$ we have $$g=\frac{4.5-K-2.5}{1}$$

and from the second situation it also equals $$\frac{4.5-K}{2.305}$$

Solving for K we first get the expression $$\frac{4.5-K-2.5}{1}=\frac{2.4-K}{2.305}$$

multiplying through by 2.305 we get $$4.61-2.305K=4.5-K$$

or $1.305K=0.11$ or $K=0.0843$. Note that 0.11 is the variable portion of 2X and that 1.305 is the variable portion of OT. Therefore K is the variable portion of X divided by the variable portion of OT.

Substituting the value of K in either of the above equations we have $g=1.9157$. Substituting now the values of both K and $g$ in equation $$OT = \frac{4.5 - K - SLT}{g}$$

we have $$OT = \frac{4.4157 - SLT}{1.9157}$$

From the above considerations and from the structure shown in Fig. 4 to be described hereinafter we know that the total time in the computer is the stack-loss time SLT plus 1.9157OT, so that if stack-loss time is 2.5 and OT is one we have a total time in the computer of 4.4157. Also, when stack-loss time is 0 we know that OT is 2.305 so that the time in the computer is 1.9157×2.305 which also gives us 4.4157. It is therefore readily seen that the total time in the computer is the total actual time of 5.5 minutes minus the one-minute semi-circle time, which was purposely kept out of the computer, minus the value K of 0.0843 leaving a balance of 4.4157 minutes (separation between pointers 25 and 40). If we now assume that the speed of the pointer 40 is such as to rotate at 1.9157 times the speed of pointer 25 and that they rotate in opposite directions it requires 4.4157 minutes worth of operation until they meet.

Attention is directed to the fact that the total time in the computer is less than the total time beween the calling of the airplane from the holding stack and its arrival at the approach landing point to an extent of minus one, minus the value of K and furthermore that this value K is equal to the variable portion of 2X, namely, 0.11 divided by the variable portion of OT, namely, 1.305 or 0.0843. It should be understood that the speed ratio 1.9157 above mentioned is not exactly correct for all situations and is in fact exactly correct only for the two values of OT used in calculating it. This is true because X varies as the angle under consideration whereas out-time OT varies as the tangent divided by the sine of that angle and these two factors do not vary exactly alike although the discrepancy is very small for small angles.

Before describing the specific embodiment of the computer illustrated in Fig. 4 of the drawings, it is deemed advisable to point out that the computer illustrated therein although particularly applicable as an airplane carried computer this computer may be located on the ground and may be used by the operator or dispatcher. The computer illustrated in Fig. 4 may be slightly less accurate in its computations than the computer specifically disclosed in our prior application Ser. No. 573,876, but is of much simpler construction and as illustrated computes sufficiently accurate for the use for which it is intended. In this connection it should be understood that the computer as illustrated in Fig. 4 of the drawings has been disclosed very conventionally so as to show its principle of operation and it will be readily understood that certain modifications may be made to render it an accurate computer which would of course require a somewhat more complicated structure but employing the same operating principles as that of the computer specifically illustrated and such changes may be made within the scope of the present invention.

*Computer structure, Fig. 4*

The computer illustrated in Fig. 4 of the drawings may conveniently be divided into four parts, namely, the stack-loss time portion, the out-time portion, the ground speed determining portion and the heading angle portion. The specific embodiment of the computer illustrated in Fig. 4 will now be described by taking up these portions of the computer one at a time.

*Stack-loss time portion.*—The bull gear 15 is preferably a constantly operating main gear which operates at a uniform speed of, say, 2.5° per minute for the specific dimensions assumed in the specific computer disclosed. Obviously, other dimensions and relative speeds may be used. This bull gear 15 may be operated by a clock mechanism 16, as illustrated, or may be operated by an electric motor having suitable constant speed characteristics such as is true of a synchronous motor. During stack-loss time measuring operation of the computer this bull gear 15 drives the stack-loss time gear 17 through the medium of shaft 18 containing pinions 19 and 20. Both of these pinions 19 and 20 preferably have the same pitch diameter and in the particular construction shown the pitch diameter of bull gear 15 is 3.88 inches and of the stack-loss gear 17 is 1.94 inches. This stack-loss time gear 17 is directly connected to the stack-loss pointer 25 through the medium of hollow shaft 24. As conventionally shown the pinions 19 and 20 are not normally in meshed relationship with the gears 15 and 17 respectively but are only in mesh with these gears during the time intervening between the pushing of the push button 3 and push button 4. As shown the push button 3 is connected to one end of a floating lever 26, pivoted at 27, and provided with forks 28 and 29 which engage flanges on the shafts 18 and 30 respectively. The opposite end of this floating lever 26 is provided with a push button 4 and the shaft 30 is provided with pinions 31 and 32. This floating lever 26 is provided with a spring 34 which normally engages the middle notch of the stop member 35. When the push button 3 is depressed until floating lever 26 strikes the stop member 22 the spring 34 engages the notch 36 to thereby couple the pinions 19 and 20 to the gears 15 and 17 respectively. When such button 4 is depressed until floating lever strikes stop member 23 the spring 34 engages the notch 38. This causes uncoupling of the pinions 19 and 20 and causes the pinions 31 and 32 to operatively engage the gears 15 and 39. After the computer illustrated has performed all of its computing functions the push buttons 3 and 4 are returned to their normal position in which the spring 34 engages the middle notch 37. It is readily seen that if the bull gear 15 turns at a speed of 2.5° per minute that the stack-loss pointer 25 will be rotated at a speed of 5° per minute providing the stack-loss gear is gear coupled to the bull gear 15.

*Out-time portion.*—The out-time pointer 40 is at times driven by the bull gear 15 through the medium of pinions 31 and 32, gear 39, epicyclic gear train PS1, S1, P1 and A1, cranks 41 and 42 and shaft 43 directly connected to the out-time pointer 40. Under no-wind conditions and after the cranks 41 and 42 have been operated to their dotted position, in response to a ground speed determining operation for setting up automatically in the computer the then prevailing ground speed more fully described hereinafter, the pivotal axes of the cranks 41 and 42 are in alignment so that the speed ratio between the gear 44 and the shaft 43 is in the ratio of one to one. Under either a head-wind or a tail-wind condition the radius ratio of cranks 41 and 42 will be greater and less than 1 to 1, respectively. It may be pointed out that the pitch diameters of the gears P1, S1 and A1 are in the ratio of 1 to 2 to 4 and that the pitch diameters of the pinions 31 and 32 are in the ratio of 1 to 3.84 whereas the diameter of the gear 39 is the same as that of the stack-loss time gear 17, namely, 1.94 inches in diameter. These various gear ratios and gear diameters are optional and have merely been specifically mentioned in order that the functioning of the computer illustrated may be more specifically discussed. From the foregoing considerations it is readily seen that if the bull gear 15 operates clockwise at a speed of 2.5° per minute the gear 39 will operate clockwise at 19.2° per minute and the crank 41 will operate counter-clockwise at half that speed and, namely, at 9.6° per minute as will also the out-time pointer 40 when the effective radii of cranks 41 and 42 is the same. Attention is directed to the fact that the operating speed of crank 42, namely, 9.6° per minute, is to the speed of operation of the pointer 25, namely, 5° per minute, as 1.9157 is to 1, which is the multiplying speed ratio above pointed out.

*Ground speed determining portion.*—As already pointed out the cranks 41 and 42 normally assume the solid line position but during the ground speed determining function of the apparatus these cranks 41 and 42 are operated in a clockwise direction and under no-wind condition to the dotted line position illustrated and simultaneous with such operation the axes of rotation of the crank 41 is lifted from the position illustrated to a position where it is lined up with the axis of shaft 43. In this connection it is desired to point out that the crank 42 is of general channel shape, as illustrated, and the crank pin 41a of crank 41 is lodged within the channel of crank 42 so that the rotation of crank 41 will cause rotation of crank 42 at a speed ratio depending upon the effectiveness of radii of the crank 41 and the crank 42. Under the particular condition illustrated, namely, the normal condition, the effective ratio of crank 41 to crank 42 is one inch to zero inches and under no-wind condition and after a ground speed run has been made by the airplane, and the ground speed has been introduced into the computer, the effective ratio of the crank 41 to crank 42 is 1 to 1 inches. As illustrated the crank 41 is connected to the annulus A1 through the medium of member 44 telescopic drive shaft 45 and universal joints or flexible connections 46 and 47. This construction is resorted to so that the axis of the crank 41 may be moved vertically, upwardly and downwardly with respect to the fixed axis of member 44 and at the same time afford a uniform speed ratio drive between these elements. This axis of crank 41 is pivoted in a bushing 49 integral with rack 50, this rack 50 being supported for vertical sliding movement in fixed supports 51 and 52. This rack 50 is gear connected to gear 55, which gear 55 preferably has a pitch diameter of 1.94 inches the same as that of gears 17, 39 and PS1. This gear 55 is at times operatively connected to the bull gear 15 through the medium of shaft 56 and pinion 57 and gear 58. The pitch diameters of pinion 57 and gear 58 are in the ratio of 1 to 8, so that the gear 55 rotates 16 times as fast as does the bull gear 15 and therefore rotates at a speed of 40° per minute. Since the gear 55 is assumed to have a pitch diameter of 1.94 inches the rack 50 will be lifted one inch during 60° rotation of gear 55, that is, during 1.5 minutes of operation of this gear 55. This is as it should be since under no-wind condition it is desired to set up a 1 to 1 radius ratio between cranks 41 and 42 and under no-wind conditions it takes an airplane 1.5 minutes to fly from aerophare RB3 to aerophare RB1. In this connection it is desired to point out that the aerophare RB3 may be omitted if dual automatic direction finding (ADF) is not employed, in that the pilot knows when he has reached the location of aerophare RB3 since he will arrive there upon completion of his semi-circular turn RB2 to RB3. This dual ADF instrument will be further discussed hereinafter. This gear 55 also operates the planet supporting gear PS1 which is assumed to have the same pitch diameter of 1.94 inches. This planet supporting gear PS1 is driven by the gear 55 through the medium of pinion 60 and idler 61. The pitch diameter of the pinion 60 is preferably one twelfth that of the pitch diameter of planet supporting gear PS1, so that this planet supporting gear PS1 will operate through an angle of 5° during 1.5 minute operation of the gear 55. Since there is a speed ratio of 2 to 3 between the planet supporting gear PS1 and annulus A1, assuming the sun gear PS1 being held stationary, this annulus A1 will operate through an arc of 7.5° during such 1.5 minutes of operation of the gear 55. In other words, during the operation of gear 55, namely during the speed run for manifesting ground speed in the computer under no-wind condition, the rack 50 is lifted one inch and the crank 41 is rotated clockwise 7.5° and to the dotted position. Obviously, during a head wind the time of the run will be increased and the time in the computer (angle between pointers 25 and 40) will be increased and the speed ratio from shaft 45 to shaft 43 will be decreased, whereas during a tail wind the time in the computer will be decreased and speed ratio for driving pointer 40 is increased.

It should be observed that pinion 57 and gear 58 are normally out of engagement with gears 15 and 55 respectively and that depression of push button 1 will put them into engagement whereas depression of push button 2 will put them out of mesh. These push buttons 1 and 2 are secured to the floating lever 71 pivoted at 72 and having a fork 73 engaging a collar 74 on shaft 56.

As illustrated in the drawings the gears 17, 39 and 55 are each biased in a counter-clockwise direction to have their detents 62, 63 and 64, respectively, engage against stops 65, 66 and 67 respectively by springs 68, 69 and 70 respectively, and that these gears are driven in a clockwise direction when they are driven through the medium of the bull gear 15 and intermediate gearing.

*Heading angle portion.*—The heading angle is read by the pilot by reading the heading angle indicated by pointer 75 on dial 76. This dial 76 is rotatably mounted and is at times driven by the stack-loss time gear 17 through the medium of the epicyclic gear train including planet gears P2, sun gear S2, planet supporting gears PS2, and annular gear A2. This drive also includes pinions 77 and 78 mounted on shaft 79 and both of the same pitch diameter and includes the idler 81 and gear 80. This epicyclic gear train is of the same construction as the one heretofore described and the gear ratios are preferably identical. It may be pointed out here that the pitch diameters of gears 17 and 80 for the particular construction shown are in the ratio of 3.25 to 1. Since pinions 77 and 78 have the same pitch diameter and since gear 81 is an idler the speed ratios of gears 17 and 80 are the inverse of their pitch diameters, namely 1 to 3.25. Attention is directed to the fact that stack-loss gear 17 is assumed to be of the same pitch diameter as gear 85, namely, 1.94 inches, so that these two gears when rotated are each rotated at a speed of 5° per minute. The gear 85 drives the crank 86 through the medium of flexible or universal joints 87 and 88 connected by a telescopic shaft section 89. This construction is resorted to because the crank 86 is pivoted in a bushing 90, integral with the rack 91, and this construction enables this rack 91 to be moved horizontally endwise in the slide supports 92 and 93 and at the same time affords a uniform speed ratio connection between gear 85 and crank 86. Under normal conditions this rack 91 assumes its 0 position, namely, with the zero directly below the fixed pointer 94, and with the rack 91 in this position the axis 96 of crank 86 is exactly 1.6 inches from the axis 97 of gear 98, the effective length of the crank 86 being this same length 1.6 inches. Gears 98 and 100 preferably have the same pitch diameter and are operatively connected through the medium of an idler 99. With the gear 85 in its normal biased position, namely, where the detent 62 of gear 17 engages the stop 65, the crank 86 is lifted to a position exactly one inch above the axis 97 of the gear 98, the crank pin 95 being confined in an arcuate slot 102 in gear 98 which arcuate slot has a radius of curvature of 1.6 inches the same as the effective length of the crank 86. By this construction the turning of the crank 86, with the rack 91 and gear 98 in their normal position, will cause no turning of the gear 98. If, however, the rack 91 is pushed endwise in either direction such endwise movement of rack 91 will cause initial turning of gear 98 and if thereafter the crank 86 is rotated counter-clockwise additional rotation of gears 98, 99 and 100 will take place. This additional turning will be referred to hereinafter as the additional drift angle ADA. Attention is directed to the fact that this gear 100 is directly connected to the heading angle pointer 75 through the medium of hollow shaft 101.

As already pointed out the maximum stack-loss time under no-wind conditions is 2.5 minutes and during this stack-loss time of 2.5 minutes the gear 17 is rotated 12.5° as a result of which the gear 85 is also rotated 12.5° in the opposite or counterclockwise direction through the medium of idlers 83 and 84, so that the crank 86 is moved counter-clockwise and the pin 95 is moved to a lower point in the slot 102 in gear 98. It is readily seen that 12.5° of counter-clockwise rotation of crank 86 will cause the crank pin 95 to move down 0.35 inch in the slot 102, because the circumference of a 1.6 inch radius circle is 10.05 inches and a 12.5° portion of this circumference is approximately 0.35 inch. These various dimensions and gear ratios were derived at by consideration of the triangles laid out in Fig. 6 of the drawings. For reasons pointed out in our prior application, Ser. No. 573,876, a drift angle of 10° should cause rotation of the drift angle pointer 75 to an extent of 14.7° of which angle the 10° portion is the drift angle itself and the 4.7° portion is the drift angle that must be compensated for due to the drifting of the airplane at the end of an out-time line OT of 2.305 minutes length.

By again referring to Fig. 6 and in view of theories more fully discussed in our prior application, just referred to, the additional drift angle ADA due to drift while circling when the out-time is only of one minute length amounts to 7.26° as indicated in Fig. 6. It is readily seen from Fig. 6, by the aid of the calculations in Fig. 7, that a line dropped down vertically from the point M to the line O—N will be $35/100$ of the length of the line O—L for these particular angles so that in order to cause the additional rotation of gear 98 of 7.26° in response to the rotation of 12.5° of the crank 86 it will be necessary for the crank pin 95 to move downwardly 0.35 inch during 12.5° rotation of the crank 86. In Fig. 7 a brief analysis has been written out to illustrate how this 0.35 inch was arrived at. It is readily seen by looking at Fig. 6 that the line M—L is equal to $r$ times the tangent of 14.7° which is 0.2617 where $r$ is the length of the line of the line O—L of Fig. 6. Also, that the length of line N—L is equal to $r$ times the tangent 21.96°, which is 0.0433. It is also readily seen that $r^1/r$ is equal to NM/NL and that NM equals NL minus ML so that $r^1$ divided by $r$ equals 0.035 and so that $r^1$ is equal to 0.35$r$. From this construction it is readily seen that the heading direction dial 76 is always rotated during stack-loss time measurement and that the heading pointer 75 is only rotated during stack-loss time measurement in the event of side drift resulting in a drift angle and that in this event it is then rotated directly in response to the movement of the rack 91 and endwise movement of crank 86 and is again rotated to an extent of ADA degrees during stack-loss time measurement through the medium of rotation of crank 86. It may be pointed out at this time that the crank 42 is biased to its vertical solid line position by a weight 105 for the purpose of holding it in a vertical position while its effective radius is zero.

*Restoring portion.*—The push button 6 is provided to restore the computer to its normal position and condition when all computing functions have been completed. As conventionally shown this push button, when depressed, releases the latches 108 and 109 as through the medium of push rods 118 and 119, respectively, to allow the return of gears 17 and 55, respectively, to their normal position. These latches 108 and 109 have been holding their respective gears in their last operated position since push buttons 4 and 2, respectively, were depressed. The push button 6 serves another purpose, namely, the return of the push buttons 3 and 4 to their normal middle position which function disengages pinions 31 and 32 from gears 15 and 39 and thereby allows the spring 69 to return the gear 39 and its associated apparatus to its normal position. This latter function is accomplished by pushing wedge 140 by push rod 141 into the V-shaped notch 142¹ cut into anvil 142 constituting part of the floating lever 26. Describing this structure a little more fully, the push button 6 has a stem 6² which is slidable in supports 143 and is provided with a pin 144 slidable in diagonal slot 145 in plate 141 so that pushing of rod 6² causes lifting of plate 141, a spring 146 being used to return the push button 6 to its normal position. Angle levers 147 and 148 are used to cause push rods 118 and 119 respectively to be pushed as push button 6 is pushed. These angle levers are pivoted on fixed supports 149.

*Operation of Fig. 4 computer (no-wind conditions, stack-loss time, 2.5 minutes).*—Let us assume that an airplane equipped with a computer such as illustrated in Fig. 4 is being stored in the holding loop HS1 (Fig. 1) and that it is flying in this oblong holding stack in the direction of the arrows to hold itself aloft. During this holding time the pilot has an opportunity to make manifest in his computer the ground speed at which he is flying while flying from radio beacon RB3 to radio beacon RB1. In order to do so he depresses the push button 1 of his computer as he passes over the radio beacon RB3 in the direction of the arrow and depresses push button 2 as he passes over beacon RB1. This depression of the push button 1 causes the gear 55 to be driven by the bull gear 15 through the medium of pinion 57 and gear 58 at a speed 16 times that of the bull gear 15. This by reason of the fact that gear 55 is half the diameter of bull gear 15 and the gear 58 has a pitch diameter 8 times that of the pitch diameter of gear 57. In other words, since under no-wind condition he will consume 1.5 minutes between beacons RB3 and RB1, the gear 55 is rotated through an arc of 60° and in so doing operates the rack 50 upwardly a distance of one inch so as to bring the axis of the crank 41 in alignment with the axis of the shaft 43. Also, during this ground speed detecting operation the cranks 41 and 42 are operated clockwise from their vertical solid line position to the dotted position illustrated, namely through an arc of 7.5°. The ratio of the effective radius of crank 41 to the effective radius of crank 42 is now 1 to 1 so that there is neither a speed increase nor a speed decrease in the drive connection from shaft 45 to shaft 43. Also, the out-time pointer 40 now assumes a position 22.08° from stack-loss time pointer 25 instead of the original 14.58° spacing and this arcuate angle of 22.08° signifies a time of 4.4157 minutes. The foregoing of course assumes that the push button 2 was depressed when the airplane passed over the radio beacon RB1 to thereby disengage the gear 58 from the gear 55 so that thereafter the gear 55 was held in its operated position by the latch 109. The pilot thereafter continues his holding operation by circling about over the holding path in the holding stack HS1.

Let us now assume that an operator at the control board illustrated in Fig. 3 orders the pilot, as through the medium of a radio telephone, to make a landing maneuver, at the instant the pilot is flying over the radio beacon RB2 in the direction of the arrows. Immediately upon being ordered to make a landing maneuver the pilot will start his semi-circular turn and will also depress the push button 3, to thereby cause engagement of pinions 19 and 20 with the gears 15 and 17 respectively. That is, the pilot conditions the computer to start measuring the stack-loss time. By referring to Fig. 1 it will immediately be seen that 2.5 minutes will elapse before the airplane passes over the radio beacon RB1 at which point in the operation of the airplane the pilot will read the heading angle by reading the pointer 75 on dial 76. The heading angle reading will be arrived at by the apparatus in a manner as later pointed out. The pilot will then depress the push button 4 to thereby cause disengagement of pinions 19 and 20 from gears 15 and 17 and will thereby also cause engagement of pinions 31 and 32 with gears 15 and 39. During the just considered 2.5 minutes operation of the computer the bull gear 15 rotated through an arc of 6.25° as a result of which the gear 17 and the stack-loss time pointer 25 rotated through an arc twice as large, namely, an arc of 12.5° leaving a balance of 22.08° minus 12.5° or 9.58° spacing between pointers 25 and 40.

During this rotation the gear 17 it also rotated the heading angle dial 76 and the gear 85 and its associated crank 86. The operation of crank 86 does, however, not perform any useful function because the crank pin 95 was directly above the axis 97 of gear 98 and its downward movement in the curved slot 102 did not cause any rotation of gear 98. The rotation of gear 17 through an arc of 12.5° does, however, produce considerable rotation of heading angle dial 76. Since the gear ratio between gears 17 and 80 is 1 to 3.25 this gear 80 is rotated to an extent of 12.5°×3.25° or 40.6°. Rotation of gear 80 and sun gear S2 in a counterclockwise direction through an arc of 40.6°, bearing in mind that the planet supporting gear PS2 is held stationary by the orientation knob 82, causes the heading direction dial 76 to be rotated in a clockwise direction through half this arc or through an arc of 20.3°. Since the original indication of pointer 75 on dial 76 was 15° to the left of the 0° indication, namely, was 345° azimuth, this additional 20.3° of rotation will cause a total angular indication of 35.3° (20.3°+15°) to be indicated, namely, an azimuth indication of 324.7°.

The pilot is therefore advised at the instant he depressed push button 4 that he must fly into the holding loop HL1 (Fig. 1) at an angle of 324.7° azimuth or 35.3° to the left of due north. As the pilot proceeds his flight along the out-time line OT1 (Fig. 1), he having depressed the push button 4, the pinions 19 and 20 are again disengaged from the gears 15 and 17 and the gear 39 is now coupled to the bull gear 15 through the medium of pinions 31 and 32, this being true because when the push button 4 was depressed it was depressed to a sufficient extent to cause the locking spring 34 to move from notch 36 to notch 38. The computer is now measuring the out-time while the airplane is flying over the dotted out-time line OT1 (Fig. 1). Under this condition the gear 39 is rotated in a clockwise direction at a speed of 19.2° per minute and against the tension of spring 69, the gear 17 now being held by the dog 108. This angular movement of gear 39 is due to the fact that this gear has half the pitch diameter as that of gear 15 which rotates at 2.5° and the pitch diameter ratios of pinions 31 and 32 is as 1 is to 3.84. Since the radius ratios of crank 41 to crank 42 is as 1 is to 1 and since there are only 9.58° separation between stack-loss time pointer 25 and out-time pointer 40 and furthermore since the speed ratio between gear 39 and annular gear A1 is as 2 is to 1, the planet supporting gear PS1 being held stationary, substantially one minute will be consumed between the depression of the push button 4 and the instant that the pointers 25 and 40 come into registration over each other. This is due to the fact that 9.58° times 2 divided by 19.2° equals substantially 1. In other words, after the pilot has flown in the direction of the out-time line OT1 (Fig. 1) for a period of substantially one minute he will begin to makes his semi-circle right-hand one-minute turn, that is, turn to the right at a rate of 3° per second, and when he reaches a point where his automatic direction finding instruments, assuming that a dual automatic direction finder is employed, will show that he is on the flight line passing through these two radio beacons RB1 and RB2 he will continue his turn along the in-time line IT (Fig. 1). The pilot will then follow this course in line with both of these beacons and as he passes over the radio beacon RB1 the total landing maneuver time of 5.696 will substantially have been consumed. This may be verified by the fact that 2.5 minutes were consumed in the holding stack, 1 was consumed on the out-time line OT1, 1 minute was consumed in making the semi-circular turn CT, 0.196 minute was consumed in flying the two distances X, and 1 minute was consumed in flying the in-time distance IT making a total of 5.696 minutes. When the pointers 25 and 40 came into registration with each other the pilot of course depressed push button 6 and thereby released dogs 108 and 109 and returned the push buttons 3 and 4 to their middle position where spring 34 rests in notch 37.

*Operation—Fig. 4 computer (no-wind condition, stack-loss time equal one minute).*—Let us assume that an airplane equipped with a computer such as illustrated in Fig. 4 is being stored in the holding loop HS1 (Fig. 1) and that it is flying in this oblong holding stack in the direction of the arrows to hold itself aloft. During this holding maneuver the pilot has an opportunity to make manifest in his computer the ground speed at which the airplane is flying from radio beacon RB3 to radio beacon RB1. In order to do so he depresses push button 1 of his computer as he passes over the radio beacon RB3 flying in the direction of the arrow and then depresses push button 2 as he passes over radio beacon RB1. This depression of push button 1 followed by the depression of push button 2 will cause the same ground speed, which will be presumed to be 135 M. P. H. to be set up in the computer as was the case in the operation just considered. Also, during this ground speed detecting operation the cranks 41 and 42 are operated clockwise from their vertical solid line position to the dotted position illustrated. The ratio of the effective radius of crank 41 to the effective radius of crank 42 is now 1 to 1 so that there is neither a speed increase nor a speed decrease in the drive connection from shafts 45 to 43. Also, the out-time pointer 40 now assumes a position 22.08° from stack-loss time pointer 25 and this arcuate angle of 22.08° signifies a time of 4.4157 minutes. The foregoing of course assumes that the push button 2 was depressed when the airplane passed over the radio beacon RB1 to thereby disengage the gear 58 from the gear 55 so that thereafter the gear 55 was held in its operated position by the latch 109. The pilot thereafter continues his holding operation by circling about over the holding path in the holding stack HS1.

Let us now assume that an operator at the control board illustrated in Fig. 3 orders the pilot, as through the medium of a radio telephone, to make a landing maneuver, at the instant the pilot is flying over a point just one minute to the rear of radio beacon RB1, assuming a no-wind ground speed of say 135 M. P. H., and that he is flying in the direction of the arrow. Immediately upon being ordered to make a landing maneuver the pilot will depress the push button 3 to thereby cause engagement of pinions 19 and 20 with the gears 15 and 17 respectively. That is, the pilot conditions the computer to start measuring the stack-loss time. By referring to Fig. 1 it will immediately be seen that one minute will elapse before the airplane passes over the radio beacon RB1 at which point in the operation of the airplane the pilot will read the heading angle by reading the pointer 75 on dial 76 the calculation of this angle being accomplished in a manner as later pointed out. The pilot will then depress the push button 4 to thereby cause disengagement of pinions 19 and 20 from gears 15 and 17 and to thereby cause engagement of pinions 31 and 32 with gears 15 and 39. During this one minute operation of the computer the bull gear 15 rotates through an arc of 2.5° as a result of which the gear 17 and the stack-loss time pointer 25 rotates through an arc of 5° leaving a balance of 17.08° between pointers 25 and 40.

During this rotation the gear 17 rotates the heading angle dial 76 and the gear 95 and its associated crank 86. The operation of crank 86 does, however, not perform any useful function because the crank pin 95 was directly above the axis 97 of gear 98 and its downward movement in the curved slot 102 does not cause any rotation of gear 98. The rotation of gear 17 through an arc of 5° does, however, produce considerable rotation of heading angle dial 76. Since the speed ratio between gears 17 and 80 is 1 to 3.25 this gear 80 is rotated to an extent of 5°×3.25° or 16.25°. Rotation of gear 80 and sun gear A2 through an arc of 16.25°, bearing in mind that the planet supporting gear PS2 is held stationary by the orientation knob 82, causes the heading direction dial 76 to be rotated through half this arc or through an arc of 8.125°. Since the original indication of pointer 75 on dial 76 was 15° to the left of the 0° indication, namely, was 345° azimuth, this additional 8.125° of rotation will cause a total angular indication of 23.125° to be indicated, namely, an azimuth indication of 336.875°.

The pilot is therefore advised that he must fly into the holding loop HL1 (Fig. 1) at an angle of 336.875° azimuth or 23.125° to the left of due north. As the pilot proceeds his flight along the out-time line OT2 (Fig. 1), he having depressed the push button 4, the pinions 19 and 20 are again disengaged from the gears 15 and 17. The gear 17 is held by latch 108 in its then operated position and the gear 39 is now coupled to the bull gear 15 through the medium of pinions 31 and 32, this being true because when the push button 4 was depressed it was depressed to a sufficient extent to cause the locking spring 34 to move from notch 36 to notch 38. The computer is now measuring the out-time while the airplane is flying over the dot-and-dash out-time line OT2 (Fig. 1). Under this condition the gear 39 is rotated in a clockwise direction against the tension of spring 69, the gear 17 now being held by the dog 108, at a speed of 19.2° per minute. This angular movement is due to the fact that gear 39 has half the pitch diameter as that of gear 15 which rotates at 2.5° per minute and the pitch diameter ratios of pinions 31 and 32 is as 1 is to 3.84. Since the radius ratios of crank 41 to crank 42 is now as 1 is to 1 and since there are only 17.08° separation between stack-loss time pointer 25 and out-time pointer 40 and furthermore since the speed ratio between gear 39 and annular gear A1 is as 2 is to 1, the planet supporting gear PS1 being held stationary, substantially 1.78 minutes will be consumed between the depression of the push button 4 and the instant that the pointers 25 and 40 come into registration over each other, this being due to the fact that 17.08° times 2 divided by 19.2° equals substantially 1.78. In other words, after the pilot has flown in the direction of the out-time line OT2 (Fig. 1) for a period of 1.78 minutes he will depress push button 6 and begin to make his semi-circle one-minute right-hand turn, that is, turn to the right at a rate of 3° per second, and when he reaches a point where his automatic direction finding instruments, assuming that a dual automatic direction finder is employed, will show that he is on the flight line passing through these two radio beacons RB1 and RB2. The pilot will then follow this course in line with both of these beacons and as he passes over the radio beacon RB1 the total landing maneuver time of 5.696 will substantially have been consumed.

The accuracy of this computation may be ascertained by calculating the value of 2X in minutes and by then adding the various time consumptions together. For an out-time of 1.78 minutes (see Fig. 1) the value of X may be calculated as follows: The tangent of the angle X about the center of the circle is the radius divided by OT or 0.318/1.78 equals 0.1786 so that the angle X is approximately 10.1°, and expressed in radians is .177. Multiplying this by the radius 0.318 we have .0563 for X and 2X equals 0.113 minute. Adding the various times: SLT=1, OT=1.78, CT=1, 2X=0.113 and 1T=1.78 we have 5.673 minutes. Subtracting this time from 5.696 minutes we have an error of .023 minute which is indeed small and tolerable.

*Operation—Fig. 4 computer (10 M. P. H. tail wind).*—Let us now assume that an airplane equipped with a computer such as illustrated in Fig. 4 is being stored in the holding loop HS1 (Figs. 1 and 8) and that it is flying in this oblong holding stack in the direction of the arrows to hold itself aloft. During this holding time the pilot has an opportunity to make manifest in his computer the ground speed at which he is flying while flying from radio beacon RB3 to radio beacon RB1. In order to do so he depresses the push button 1 of his computer as he passes over the radio beacon RB3 in the direction of the arrow and depresses push button 2 as he passes over beacon RB1. This depression of the push button 1 causes the gear 55 to be driven by the bull gear 15, through the medium of pinion 57 and gear 58, at a speed 16 times that of the bull gear 15. This by reason of the fact that gear 55 is half the diameter of gear 15 and the gear 58 has a pitch diameter 8 times that of the pitch diameter of pinion 57. In other words, since under 10 M. P. H. tail wind condition taken along the line 129 (Fig. 8) he will consume only about 1.4 minutes between beacons RB3 and RB1, the gear 55 is rotated through an arc of 56° and in so doing operates the rack 50 upwardly a distance of 0.94 inch so as to bring the axis of the crank 41 below the axis of the shaft 43 to an extent of 0.06 inch. Also, during this ground speed detecting operation the cranks 41 and 42 are operated clockwise from their vertical solid line position through an arc of 7° to a position 0.5° counterclockwise of the dotted position illustrated. The ratio of the effective radius of crank 41 to the effective radius of crank 42 is now 1 to 0.94 so that there is a speed increase in the drive connection from shaft 45 to shaft 43 of 0.94 to 1. Also, the out-time pointer 40 now assumes a position 21.58° from stack-loss time pointer 25 and this arcuate angle of 21.58° signifies a time of 4.3 minutes. The foregoing of course assumes that the push button 2 was depressed when the airplane passed over the radio beacon RB1 to thereby disengage the gear 58 from the gear 55 so that thereafter the gear 55 is held in its operated position by the latch 109. The pilot thereafter continues his holding operation of circling about in the holding path in the holding stack HS1. The line 129 in each of Figs. 8–11 is taken as a sort of average direction of flight in the holding loop and head and tail winds along this line whereas side winds are winds at right angle thereto.

Let us now assume that an operator at the control board illustrated in Fig. 3 orders the pilot, as through the medium of a radio telephone, to make a landing maneuver, a short time after the pilot flies over the radio beacon RB2 in the direction of the arrow. The operator at this time inserts a flag 167 in the token identifying the airplane under consideration. Immediately upon being ordered to make a landing maneuver the pilot will depress the push button 3 of his computer, to thereby cause engagement of pinions 19 and 20 with the gears 15 and 17 respectively. That is, the pilot conditions the computer to start measuring the stack-loss time. By referring to Fig. 8 it will immediately be seen that less than 2.5 minutes will elapse before the airplane passes over the radio beacon RB1, by reason of the 10 M. P. H. tail wind, at which point in the flight of the airplane the pilot will read the heading angle by reading the pointer 75 on dial 76, which reading is created in a manner as later pointed out, and will then depress the push button 4 to thereby cause disengagement of pinions 19 and 20 from gears 15 and 17 and to thereby cause engagement of pinions 31 and 32 with gears 15 and 39. Let us assume that 2 minutes were consumed in the holding stack of Fig. 8, a fair assumption. During this 2 minutes operation of the computer the bull gear 15 rotates through an arc of 5° as a result of which the gear 17 and the stack-loss time pointer 25 rotate through an arc twice as large, namely, an arc of 10° leaving a balance of 21.58 minus 10° or 11.58° between pointers 25 and 40.

During this rotation of the gear 17 it also rotates the heading angle dial 76 and the gear 85 and its associated crank 86. The operation of crank 86 does, however, not perform any useful function because the crank pin 95 is directly above the axis 97 of gear 98 and its downward movement in the curved slot 102 does not cause any rotation of gear 98. The rotation of gear 17 through an arc of 10° does, however, produce considerable rotation of heading angle dial 76. Since the speed ratio between gears 17 and 80 is 1 to 3.25 this gear 80 is rotated to an extent of 10°×3.25° or 32.5°. Rotation of gear 80 and sun gear S2 through an arc of 32.5°, bearing in mind that the planet supporting gear PS2 is held stationary by the orientation knob 82, causes the heading direction dial 76 to be rotated through half this arc or through an arc of 16.25°. Since the original indication of pointer 75 on dial 76 was 15° to the left of the 0° indication, namely, was 345° azimuth, this additional 16.25° of rotation will cause a total angular indication of 31.25° (16.25°+15°) to be indicated, namely, an azimuth indication of 328.75°.

The pilot is therefore advised that he must fly into the holding loop HL1 (Fig. 8) at an angle of 328.75° azimuth or 31.25° to the left of due north. As the pilot proceeds his flight along an out-time line OT and 110 making this angle (Fig. 8), he having depressed the push button 4, the pinions 19 and 20 are again disengaged from the gears 15 and 17 and the gear 39 is now coupled to the bull gear 15 through the medium of pinions 31 and 32, this being true because when the push button 4 was depressed it was depressed to a sufficient extent to cause the locking spring 34 to move from notch 36 to notch 38. The computer is now measuring the out-time while the airplane is flying over an out-time line 110 as above defined (Figs. 1 and 8). Under this condition the gear 39 is rotated in a clockwise direction at a speed of 19.2° per minute and against the tension of spring 69, the gear 17 now being held by the dog 108. This angular movement is due to the fact that gear 39 has half the pitch diameter as that of gear 15 which rotates at 2.5° and the pitch diameter ratio of pinions 31 and 32 is as 1 is to 3.84. Since the radius ratio of crank 41 to crank 42 is as 1 is to 0.94 and since there is only a 11.58° separation between stack-loss time pointer 25 and out-time pointer 40 and furthermore since the speed ratio between gear 39 and annular gear A1 is as 2 is to 1, the planet supporting gear PS1 being held stationary, substantially 1.135 minutes will be consumed between the depression of the push button 4 and the instant that the pointers 25 and 40 come into registration over each other, this being due to the fact that 11.58° times 0.94/1 or 10.9 is the permissible rotation of annulus A1 so that 10.9° times 2 or 21.8 is the permissible rotation of gear 39 and 21.8 divided by 19.2° equals substantially 1.135 minutes. In other words, after the pilot has flown in the direction of the out-time line 110 above defined (Fig. 8) for a period of 1.135 minutes he will begin to make his semi-circle one-minute turn 111 (Fig. 8), that is, turn to the right at a rate of 3° per second, and when he reaches a point where his automatic direction finding instruments, assuming that a dual automatic direction finder is employed, will show that he is on the flight line passing through these two radio beacons RB1 and RB2 he will discontinue his turn. The pilot will then follow this course in line with both of these beacons along the line 113 and as he passes over the radio beacon RB1 the total landing maneuver time of 5.696 will substantially have been consummated.

The accuracy of this computation (see Fig. 8) may be ascertained by calculating the value of 2X in minutes and by then adding the various time consumptions together. For an out-time of 1.135 minutes (see Fig. 1) the value of X may be calculated as follows: the tangent of the angle X about the center of the circle is the radius divided by OT or 0.318/1.135 equals 0.235 so that the angle X is approximately 13.2°, and expressed in radians is 0.23. Multiplying this by the radius 0.318 we have 0.073 for X and 2X equals 0.146 minute. Adding the various times: stack-loss time SLT=2, OT along line 110=1.135, circle time CT=1, 2X=0.146, and in-time IT along line 113=1.135 times 145/125 or 1.32, plus semi-circle drift time .091 we have 5.692 minutes. Subtracting this time from 5.696 minutes we have an error of 0.004 minute which is indeed a small error and tolerable.

*Operation—Fig. 4 computer (10 M. P. H. head wind, stack-loss time equal 2.5 minutes).*—Since head winds are seldom encountered, in that a head wind, when flying toward the holding loop, is seldom encountered since landing on a runway is always into the wind, only a diagrammatic outline of the effect of a head wind has been illustrated in Fig. 9 and a specific operation of the system under this condition is deemed unnecessary and will be dispensed with.

*Operation—Fig. 4 computer (left wind sufficient to make —10° drift angle stack-loss time equal 2.5 minutes).*—Let us assume that an airplane equipped with a computer such as illustrated in Fig. 4 is being stored in the holding loop HS1 (Figs. 1 and 10) and that it is flying in this oblong holding stack in the direction of the arrows to hold itself aloft. During this holding time the pilot has an opportunity to make manifest in his computer the ground speed at which he is flying while flying from radio beacon RB3 to radio beacon RB1. In order to do so he depresses the push button 1 of his computer as he passes over the radio beacon RB3 in the direction of the arrow and depresses push button 2 as he passes over beacon RB1. This depression of the push button, for reasons hereinbefore given, causes the gear 55 to be driven by the bull gear 15 at a speed 16 times that of the bull gear 15. Since neither a head wind nor a tail wind is assumed to be existing the radius ratio of cranks 41 and 42 is 1 to 1 and these cranks 41 and 42 will be operated to the dotted position during the ground speed determining run from beacon RB3 to RB1. Also, the out-time pointer 40 now assumes a position 22.08° from stack-loss time pointer 25 and this arcuate angle of 22.08° signifies a time of 4.4157 minutes. The foregoing of course assumes that the push button 2 was depressed when the airplane passed over the radio beacon RB1 to thereby disengage the gear 58 from the gear 55 so that thereafter the gear 55 is held in its operated position by the latch 109. The pilot thereafter continues his holding operation of circling about in the holding path in the holding stack HS1 until he is either instructed to change altitude or is requested to start a landing maneuver.

While the pilot flies from beacon RB3 to beacon RB1 he keeps the two pointers of his dual ADF (automative direction finding) instrument lined up on these respective beacons and then reads his gyro compass. He will note that there is a discrepancy of —10° manifesting a —10° drift angle due to a west wind. The pilot will now turn his drift knob 110 until a —10° reading is indicated on rack 91 by arrow 94 (Figs. 4 and 5). This will cause the crank 86 to be pushed toward the left until the gear 98 has rotated counter-clockwise through an angle of 14.7° (see Figs. 4 and 6). This causes 14.7° counter-clockwise rotation of gear 100 and counter-clockwise rotation of heading pointer 75 to the same extent. The original heading angle reading of 15° has therefore been changed to 29.7° west of true north, namely, to azimuth 330.3°.

An ADF instrument is a radio controlled motor operated pointer that will point at the radio beacon to which it is tuned and a dual ADF instrument is one that has two such pointers each pointer operating mechanism of which may be tuned to its particular radio beacon.

Let us now assume that an operator at the control board illustrated in Fig. 3 orders the pilot, as through the medium of a radio telephone, to make a landing maneuver at the instant the pilot is flying over the radio beacon RB2 in the direction of the arrow. Immediately upon being ordered to make a landing maneuver the pilot will start his semi-circular left-hand turn and will depress the push button 3, to thereby cause engagement of pinions 19 and 20 with the gears 15 and 17 respectively. That is, the pilot conditions the computer to start measuring the stack-loss time. By referring to Figs. 1 and 10 it will immediately be seen that 2.5 minutes will elapse before the airplane passes over the radio beacon RB1, at which point in the operation of the airplane the pilot will read the heading angle by reading the pointer 75 on dial 76, which reading is created in a manner as later pointed out, and he will then depress the push button 4 to thereby cause disengagement of pinions 19 and 20 from gears 15 and 17 and to thereby cause engagement of pinions 31 and 32 with gears 15 and 39. As above mentioned 2.5 minutes were consumed in the holding stack. During this 2.5 minutes operation of the computer the bull gear 15 rotates through an arc of 6.25° as a result of which the gear 17 and the stack-loss time pointer 25 rotates through an arc twice as large, namely, an arc of 12.5° leaving a balance of 22.08° minus 12.5° or 9.58° between pointers 25 and 40.

During this rotation of the gear 17 it also rotates the heading angle dial 76 and the gear 85 and its associated crank 86. The crank 86, since gears 17 and 85 have the same pitch diameter rotates 12.5°. The operation of crank 86 in a counter-clockwise direction results in a 0.35 inch downward movement of pin 95 in the curved slot 102 to cause an additional counter-clockwise rotation of gear 98 to an extent 7.26° for reasons discussed in connection with Fig. 6 of the drawings. The rotation of gear 17 through an arc of 12.5° produces considerable rotation of heading angle dial 76. Since thte gear ratio between gears 17 and 80 is 1 to 3.25 this gear 80 is rotated to an extent of 12.5°×3.25° or 40.6°. Rotation of gear 80 and sun gear S2 in a counter-clockwise direction through an arc of 40.6°, bearing in mind that the planet supporting gear PS2 is held stationary by the orientation knob 82, causes the heading direction dial 76 to be rotated in a clockwise direction through half this arc or through an arc of 20.3°. Since the original indication of pointer 75 on dial 76, after the rack 91 was set to the −10° position, was 29.7° to the left of the 0° indication and since the additional rotation of pointer 75 due to crank pin 95 moving down in curved slot 102 amounted to 7.26° making grand initial reading of 36.96°, namely, was 323.04° azimuth, this additional 20.3° of rotation will cause a total angular indication of 57.26° (20.3°+36.96°) to be indicated, namely, an azimuth indication of 302.74°.

The pilot is therefore advised that he must fly into the holding loop HL1 (Figs. 1 and 10) at an angle of 302.74° azimuth or 57.26° to the left of due north. As the pilot proceeds his flight along an out-time line OT (121 Fig. 10) heading at that angle (Figs. 1 and 10), he having depressed the push button 4, he will aim his airplane in the direction of the line 120 (Fig. 10) but by reason of the drift will actually follow the line 121 and at the end of the out-time, namely, when pointers 25 and 40 come into registration with each other, the airplane will have reached location 123. The pilot will of course now make a right-hand semi-circular turn and by the aid of the drift will follow the curved path 124 and at the end of his semi-circular swing will land at location 125. Had there been no wind he would have headed along out-time line 126, followed turn 127 and arrived at this same point 125 (Fig. 10).

As pointed out above the pilot depressed push button 4 when he started flying the out-time line 121 and this caused the pinions 19 and 20 to be disengaged from the gears 15 and 17 and caused the gear 39 to be coupled to the bull gear 15 through the medium of pinions 31 and 32. This is true because when the push button 4 was depressed it was depressed to a sufficient extent to cause the locking spring 34 to move from notch 36 to notch 38. The computer is now measuring the out-time while the airplane is flying over the out-time line 121 (Fig. 10). Under this condition the gear 39 is rotated in a clockwise direction at a speed of 19.2° per minute and against the tension of spring 69, for reasons heretofore given, the gear 17 now being held by the dog 108. Since the radius ratio of crank 41 to crank 42 is as 1 is to 1 and since there is only a 9.58° separation between stack-loss time pointer 25 and out-time pointer 40 and furthermore since the speed ratio between gear 39 and annular gear A1 is as 2 is to 1, the planet supporting gear PS1 being held stationary, substantially 1 minute will be consumed between the depression of the push button 4 and the instant that the pointers 25 and 40 come into registration over each other, this being due to the fact that 9.58° times 2 times 1/1 divided by 19.2° equals substantially 1. In other words, after the pilot has flown in the direction of the out-time line 121 by pointing his airplane in the direction of line 120 for a period of 1 minute he will begin to make his semi-circle one-minute turn, that is, turn to the right at a rate of 3° per second, and because aided by the drift over path 124 and when he reaches a point where his automatic direction finding instruments, assuming that a dual automatic direction finder is employed, will show that he is on the flight line passing through these two radio beacons RB1 and RB2 he will discontinue his turn. The pilot will then follow this course in line with both of these beacons and as he passes over the radio beacon RB1 the total landing maneuver time of 5.696 will substantially have been consummated. This is true because stack-loss time of 2.5, out time of 1, circle time of 1, 2X time of 0.196, and in-time of 1 minute have been consumed making a total time of 5.696 minutes.

It is readily seen from Fig. 4 that had the stack-loss time been zero the crank 86 would not have been operated at all and in that case the drift compensating angle would have been only 14.7° rotation of gear 100 due to movement of the rack 91 manually to its −10° position. In that case the pilot would have aimed his airplane in the direction of dot-and-dash line 138 (Fig. 10) but would have flown up line 139 due to the side drift to point 141, after which he would have circled over path 140 to the in-time line and then flown toward beacons RB1 and RB2.

*Operation—Fig. 4 computer (right wind sufficient to make +10° drift angle stack-loss time equal 2.5 minutes).*—Let us assume that an airplane equipped with a computer such as illustrated in Fig. 4 is being stored in the holding loop HS1 (Figs. 1 and 11) and that it is flying in this oblong holding stack in the direction of the arrows to hold itself aloft. During this holding time the pilot has an opportunity to make manifest in his computer the ground speed at which he is flying while flying from radio beacon RB3 to radio beacon RB1. In order to do so he depresses the push button 1 of his computer as he passes over the radio beacon RB3 in the direction of the arrow and depresses push button 2 as he passes over beacon RB1. This depression of the push button, for reasons hereinbefore given, causes the gear 55 to be driven by the bull gear 15 at a speed 16 times that of the bull gear 15. Since neither head wind nor a tail wind is assumed to be existing the radius ratio of cranks 41 and 42 is 1 to 1 and these cranks 41 and 42 will be operated to the dotted position during the ground speed determining run from beacon RB3 to RB1. Also, the out-time pointer 40 now assumes a position 22.08° from stack-loss time pointer 25 and this arcuate angle of 22.08° signifies a time of 4.4157 minutes. The foregoing of course assumes that the push button 2 was depressed when the airplane passed over the radio beacon RB1 to thereby disengage the gear 58 from the gear 55 so that thereafter the gear 55 is held in its operated position by the latch 109. The pilot thereafter continues his holding operation of circling about in the holding path in the holding stack HS1 until he is either instructed to change altitude or is asked to start a landing maneuver.

While the pilot flies from beacon RB3 to beacon RB1 he keeps the two pointers of his dual ADF (automatic direction finding) instrument lined up and then reads his gyro compass. He will note that there is a discrepancy of +10° manifesting a +10° drift angle due to an east wind. The pilot will now turn his drift knob 110 until a +10° reading is indicated on rack 91 by arrow 94 (Figs. 4 and 5). This will cause the crank 86 to be pulled toward the right until the gear 98 has rotated clockwise through an angle of 14.7° (see Figs. 4 and 6). This causes 14.7° clockwise rotation of gear 100 and clockwise rotation of heading pointer 75 to the same extent. The original heading angle reading will now be 0.3° west of true north, instead of 15° as heretofore, namely, will read azimuth 359.7°.

Let us now assume that an operator at the control board illustrated in Fig. 3 orders the pilot, as through the medium of a radio telephone, to make a landing maneuver at the instant the pilot is flying over the radio beacon RB2 in the direction of the arrow. Immediately upon being ordered to make a landing maneuver the pilot will start his left-hand semi-circular turn and will depress the push button 3, to thereby cause engagement of pinions 19 and 20 with the gears 15 and 17 respectively. That is, the pilot conditions the computer to start measuring the stack-loss time. By referring to Figs. 1 and 11 it will immediately be seen that about 2.5 minutes will elapse before the airplane passes over the radio beacon RB1 because the side wind will have little effect, at which point in the operation of the airplane the pilot will read the heading angle by reading the pointer 75 on dial 76, which reading is created in a manner as later pointed out, and he will then depress the push button 4 to thereby cause disengagement of pinions 19 and 20 from gears 15 and 17 and to thereby cause engagement of pinions 31 and 32 with gears 15 and 39, respectively. As above mentioned 2.5 minutes were consumed in the holding stack. During this 2.5 minutes operation of the computer the bull gear 15 rotates through an arc of 6.25° as a result of which the gear 17 and the stack-loss time pointer 25 rotate through an arc twice as large, namely, an arc of 12.5° leaving a balance of 22.08° minus 12.5° or 9.58° between pointers 25 and 40.

During this rotation of the gear 17 in a clockwise direction it rotates the heading angle dial 76 in a clockwise direction and the gear 85 and its associated crank 86 in a counterclockwise direction. The crank 86, since gears 17 and 85 have the same pitch diameter, rotates 12.5°. This extent of operation of crank 86 results in a 0.35 inch downard movement of pin 95 in the curved slot 102 to cause an additional clockwise rotation of gear 98 to an extent 7.26° for reasons discussed in connection with Fig. 6 of the drawings. The pointer 75 now reads 0.3°−7.26° or −6.96°. The rotation of gear 17 through an arc of 12.5°, however, produces considerable rotation of heading angle dial 76 and thereby changes this reading. Since the speed ratio between gears 17 and 80 is 1 to 3.25 this gear 80 is rotated to an extent of 12.5°×3.25° or 40.6°. Rotation of gear 80 and sun gear A2 through an arc of 40.6°, bearing in mind that the planet supporting gear PS2 is held stationary by the orientation knob 82, causes the heading direction dial 76 to be rotated in a clockwise direction through half this arc or through an arc of 20.3°. Since the original indication of pointer 75 on dial 76 was 0.3° to the left of the 0° indication and since the additional clockwise rotation of pointer 75 due to crank pin 95 moving down in curved slot 102 amounted to 7.26° making grand initial reading of 0.3°−7.26° or +6.96° to the right of zero, namely, was 6.96° azimuth, this 20.3° of clockwise rotation of dial 76 will cause a total angular indication of 13.34° to the left of zero (20.3°−6.96°) to be indicated, namely, an azimuth indication of 346.66°.

The pilot is therefore advised that he must fly into the holding loop HL1 (Figs. 1 and 11) at an angle of 346.66° azimuth or 13.34° to the left of due north. As the pilot proceeds to head in that direction he actually flies along an out-time line 131 making an angle 23.34° to the left of due north (Figs. 1 and 11). In other words, the pilot having depressed the push button 4, he will aim his airplane in the direction of the line 130 (Fig. 11) but by reason of the drift will actually follow the line 131 and at the end of the out-time, namely, when pointers 25 and 40 come into registration with each other, the airplane will have reached location 133. The pilot will of course now make a right-hand semi-circular turn and by the effect of the drift will follow the curved path 134 and at the end of his semi-circular swing will land at location 135. Had there been no wind he would have headed along out-time line 136 followed turn 137 and arrived at this same point 135 (Fig. 11).

As pointed out above the pilot depressed push button 4 when he started flying the out-time line 131 and this caused the pinions 19 and 20 to be disengaged from the gears 15 and 17 and caused the gear 39 to be coupled to the bull gear 15 through the medium of pinions 31 and 32. This is true because when the push button 4 was depressed it was depressed to a sufficient extent to cause the locking spring 34 to move from notch 36 to notch 38. The computer is now measuring the out-time while the airplane is flying over the out-time line 131 (Fig. 11). Under this condition the gear 39 is rotated in a clockwise direction at a speed of 19.2° per minute and against the tension of spring 69, for reasons heretofore given, the gear 17 now being held by the dog 108. Since the radius ratio of crank 41 to crank 42 is as 1 is to 1 and since there is only a 9.58° separation between stack-loss time pointer 25 and out-time pointer 40 and furthermore since the speed ratio between gear 39 and annular gear A1 is as 2 is to 1, the planet supporting gear PS1 being held stationary, substantially 1 minute will be consumed between the depression of the push button 4 and the instant that the pointers 25 and 40 come into registration over each other, this being due to the fact that 9.58° times 2 times 1/1 divided by 19.2° equals substantially 1. In other words, after the pilot has flown in the direction of the out-time line 131 by pointing his airplane in the direction of line 130 for a period of 1 minute he will begin to make his semi-circle one-minute turn, that is, turn to the right at a rate of 3° per second, and over path 134 and when he reaches a point where his automatic direction finding instruments, assuming that a dual automatic direction finder is employed, will show that he is on the flight line passing through these two radio beacons RB1 and RB2 he will discontinue his turn. The pilot will then follow this course in line with both of these beacons and as he passes over the radio beacon RB1 the total landing maneuver time of 5.696 will substantially have been consummated. This is true because stack-loss time of 2.5, out-time of 1, circle time of 1, 2X time of 0.196, and in-time of 1 minute have been consumed making a total time of 5.696 minutes.

The angle computation is also substantially correct because the pilot must steer 10° toward the right of where he actually must fly (see Fig. 11) and will thereby arrive at point 133 and since his drift during circling time is more than 10° to the extent of 2X the drift during circling must be taken care of by allowing 10°+0.196 (namely, 2X) times 10° or 1.96° making a total of 11.96°. Subtracting the sum of these two values, namely, 21.96 from 35.3° we have a remainder of 13.34° which is the angle to the left of due north where the pilot must head his airplane which is the same as that computed by the computer.

Figure 2:
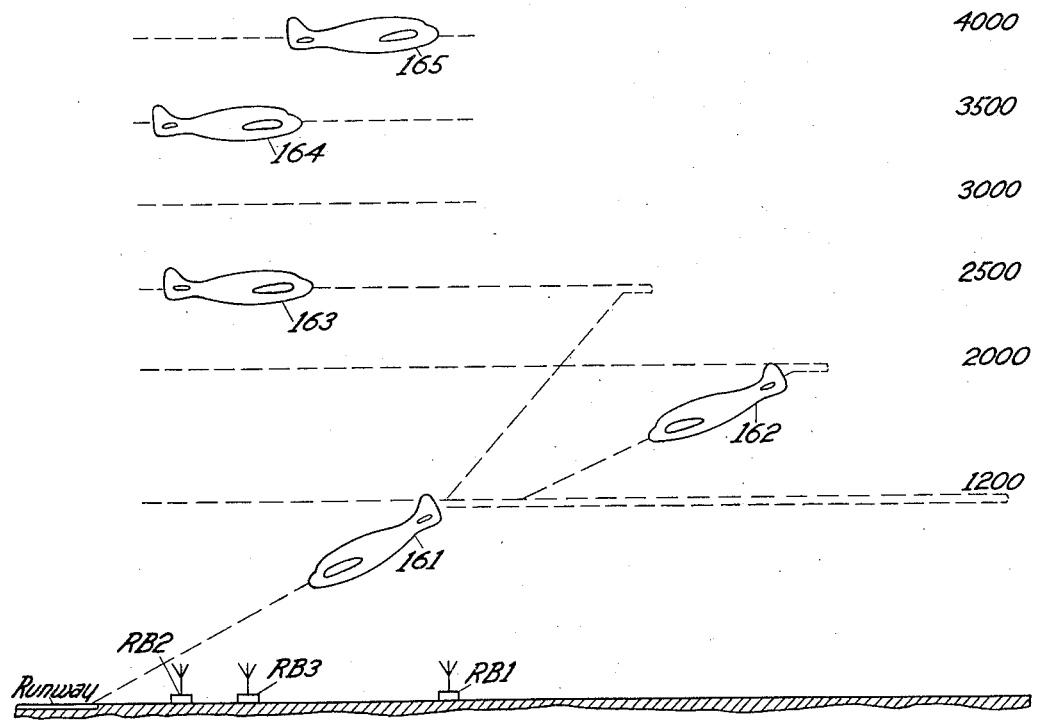
Fig. 2 illustrates a side view of the flying patterns illustrated in Fig. 1 illustrating airplanes at various altitudes in such flying patterns.

*Fig. 3 structure.*—In Fig. 3 has been illustrated a control board for a central holding stack such as the stack HS1 (Fig. 1) to make a pictorial record of the airplanes stored at particular altitudes in the holding stack HS1 (Fig. 1) as shown in side elevation in Fig. 2. The ground level has been designated Gr and the various altitudes have been designated 1200, 2000, 2500, 3000, 3500 and 4000, meaning feet, the last two zeros having been, for convenience, omitted from these numbers on the control board. As is evident from Fig. 1 the control board is also applicable to the holding loop HL1 at least insofar as the lower three altitudes are concerned.

For each altitude on the control board (Fig. 3) there is provided a green lamp $g$, a yellow lamp $y$, and a red lamp $r$, a push button PB and a token jack OTJ. Circuits are provided, such as disclosed in our prior application, Ser. No. 573,876, above referred to of such construction that momentary depression of the push button PB for any particular altitude will cause the normally energized green lamp $g$, signifying a vacant altitude, to be extinguished and the yellow lamp $y$, signifying caution, for that altitude to be energized. The insertion of a token in the token jack OTJ for that altitude on the board will cause the yellow lamp $y$ to be extinguished and the red lamp $r$, signifying occupancy, to be energized and the removal of the token from the token jack OTJ will cause the red lamp $r$ to be extinguished and the green lamp $g$ to be again lighted.

In practice the push button for a particular altitude is depressed when an airplane is instructed to enter that altitude so that the lighted yellow lamp $y$ signifies a warning that this altitude is soon to be occupied. The token will be inserted when the pilot reports entering such altitude and will be removed when he reports vacating such altitude. The circuits above mentioned may be either used as pointed out, or if desired, they may be interconnected with a monitor's token jack as disclosed in our above mentioned prior application so that the monitor must confirm the fact that a particular altitude has actually been vacated before the green lamp can be relighted. Circuits for accomplishing this are disclosed in our said prior application.

The control board is mounted on the back of a table as shown in Fig. 3 and is preferably provided with suitable timing means. Although this timing means may be of a construction such as shown in Fig. 4 and Fig. 5 of our prior application, it may be of much simpler construction, and a stop watch 150 and a wall clock 151 have been illustrated for this purpose. The stop watch 150 is preferably of the usual construction where a timing hand 152 is normally held at rest, is started into operation by depressing an associated push button 153, is stopped by depressing the same or a different push button 154 and is returned to its original position by depressing the same or a reset push button 157. In Fig. 3 only a single push button 153 has been illustrated whereas in the Fig. 19 construction, illustrating a stop watch to be used on the airplane, a three push button stop watch has been shown. A radio telephone 155 has also been show the microphone of which may be plugged into receptacle 156.

Tokens 161, 162, 163, 164 and 165 have been shown inserted in the token jacks OTJ for altitudes 1200, 2000, 2500, 3000, 3500 and 4000 respectively and these represent like numbered airplanes illustrated in Fig. 2 of the drawings. It will be seen that each of tokens 161, 162 and 163 is provided with a flag 167. These flags signify that the pilot of each of the airplanes 161, 162 and 163 (Fig. 2) have already been ordered to make a landing maneuver. The operator or dispatcher at the control board shown in Fig. 3 attaches such a flag 167 to each token as he calls the corresponding airplane for a landing maneuver. These landing instructions are of course time spaced substantially equal time periods apart so that these airplanes will get into the approach position over beacon RB1, when flying toward the runway, at substantially like time spaced instances. Successive instructions to proceed to the next lower altitude will be given only in accordance with reported vacancy of the next lower altitude so that vertical separation is assured and horizontal separation is assured by the calling of successive airplanes in the order of their altitudes in succession at equally spaced time periods, the actual separation being assured by the use of a computer, such as shown in Fig. 4, by each of the pilots. These computers assure that for each landing maneuver the stack-loss time plus the holding-loop time is a fixed time which may be considerably more than the time interval between successive maneuver startings in that these maneuvers are overlapped. It is proposed to start landing maneuvers only from the lower three altitudes and that airplanes stored in higher altitudes be laddered down in the holding stack as lower altitudes become vacant.

*Complete operation.*—Let us assume that airplane landings are contemplated at three minute time spaced intervals, and that altitudes 1200, 2000 and 2500 (Fig. 2) are occupied by airplanes 161, 162 and 163 respectively. Let us assume that these airplanes are called three minutes apart in that order. Since the total maneuver time is approximately 5.696 minutes for the specific computer construction assumed it is readily seen that the airplane 162 starts its landing maneuver when the landing maneuver of airplane 161 is substantially half completed and that airplane 163 will be called for a landing maneuver before the airplane 161 has actually landed on the runway. These relationships are illustrated in Fig. 2 of the drawings by dotted lines. These dotted lines also show that the stack-loss time measured by the computer in airplane 161 was very small or zero, that the stack-loss time for airplane 162 was larger and that for airplane 163 it was still larger. This diagram (Fig. 2) also clearly illustrates that the maneuver instructions are carried out in such altitude as is then assigned to that airplane and that part of a particular maneuver may be carried out in one altitude and that a later portion of such maneuver may be carried out in one or two lower altitudes. In other words, instructions to ladder down into lower altitudes may be given, accepted and acted upon at any time in any landing maneuver and may even occur twice in a single landing maneuver. The flags 167 carried by certain tokens are deemed necessary to keep a pictorial record of the airplanes that have already been instructed to make a landing maneuver. Since these tokens are moved from altitude to altitude and since the information these flags 167 signify should likewise move from altitude to altitude these flags are preferably fixed to the token so as to keep this information with the token identifying such airplane. Each time a particular pilot is instructed to start a landing maneuver such a flag 167 is struck into a hole in the token identifying that pilot's airplane as illustrated in Fig. 3.

Since the operation of laddering down of airplanes in the holding stack or holding loop is obvious from the foregoing discussion and since numerous operations of landing maneuvers have already been described it is believed unnecessary to specifically recite how these operations are carried out simultaneously and therefore a specific general operation will not be given. Also, since specific operations under tail wind conditions and specific operations under side wind conditions have been given it is believed unnecessary to describe the operation of the computer under a diagonal wind condition because this is merely a situation where both tail wind and side wind conditions are prevalent simultaneously.

Figure 12:
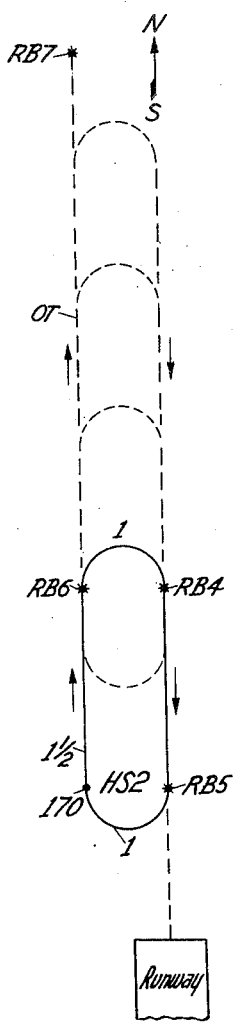
Fig. 12 illustrates a modified flying pattern in connection with which the invention of Figs. 4 and 5 may be practiced by slight modification of the airplane computer illustrated in Fig. 4.

*Modified pattern—Fig. 12 and computer therefor.*—In Fig. 12 has been shown a modified flying pattern wherein the holding stack is defined by radio beacons RB4, RB5 and RB6 and the actual flying path of this stack has been shown by solid lines, whereas one stack-loss flying path and several holding loop paths of various lengths have been shown by dotted lines. It will be seen that the holding stack HS2 (Fig. 12) is of the same time dimensions as the holding stack HS1 (Fig. 1) but that it is oriented somewhat differently with respect to the runway. Since the out-time line OT may be rather accurately flown by reason of directing one automatic direction finding instrument on the radio beacon RB7 and by directing a second ADF instrument backwardly onto beacon RB6 no side wind compensation need be made by the computer and for this reason the drift knob 110 (Fig. 4) may be left in its zero position or this knob 110 and its associated apparatus may be entirely omitted from the computer or if retained it may be disregarded. Also, the heading dial 76 and heading pointer 75 may be entirely dispensed with or the readings given thereby be disregarded when the computer of Fig. 4 is used with the flying pattern of Fig. 12. Putting this in different words, since the out-time and in-time lines are now parallel the heading angle no longer varies with the length of the out-time line. Also, since an ADF instrument pointing to a near-by beacon (assuming that only one ADF instrument is used) instead of a magnetic compass pointing at the north pole is used side drift does not blow the airplane appreciably off of the contemplated path. As already pointed out the holding stack HS2 resides in two straight line paths each 1.5 minutes long (under no head and no tail wind condition) which are at their ends connected by 1 minute semi-circles. Also, since the holding loops involve parallel straight line runs the variable quantity 2X disappears. The maximum stack-loss time is the same as in the Fig. 1 pattern, namely, 2.5 minutes. For these various reasons the out-time computing portion of the computer shown in Fig. 4 must be slightly modified when it is to be used with the Fig. 12 flying pattern.

We may for instance take the position that the minimum out-time for the Fig. 12 flying pattern shall be 0.25 minute. Then the in-time under minimum out-time conditions (maximum stack-loss conditions) is also 0.25 minute and since the circle time is 1 minute the total maneuver time is 2.5 plus 0.25 plus 1 plus 0.25 or 4 minutes. Also, since the turn time, a constant, is excluded from the computer the total time set up in the computer is 3 minutes. That is, after the ground speed determining run under no-wind conditions has been made the pointers 25 and 40 (Fig. 4) are so placed on their respective shafts 24 and 43 that they are 15°, equivalent to 3 minutes apart and before this ground speed determining run was made, namely, under normal conditions, these pointers 25 and 40 are 7.5° less or only 7.5° apart. Also, since the variable time quantity $2x$ is no longer a problem the gear 39 under out-time measuring operation need no longer operate at 19.2° per minute as heretofore but may now operate at 20° per minute. To obtain this speed of 20° per minute for this modification of the computer of Fig. 4 the pitch diameter ratio of gears 31 and 32 is as 1 is to 4 instead of as 1 is to 3.84, as heretofore. In other words, the computer of Fig. 4 when used with the flying pattern of Fig. 12 is modified by so placing the pointers 25 and 40 on their respective shafts that they are normally 7.5° apart and are 15° apart, signifying 3 minutes, after the ground speed determining run under no-wind conditions has been made; the pitch diameter ratio of gears 31 to 32 is as 1 is to 4 and the heading angle feature is either disregarded or the heading angle pointer 75 is removed from the computer. In all other respects the computer is unchanged when modified to be used with the Fig. 12 flying pattern. The laddering down features and the control board of Fig. 3 is of course unchanged when used with the Fig. 12 flying pattern.

*Fig. 12 operation (no-wind condition).*—Let us assume that an airplane stored in holding stack HS2 (Fig. 12) makes the usual ground speed determining run from a point 170 to radio beacon RB6 by depressing push buttons 1 and 2, push button 1 being depressed when the airplane passes over point 170 and push button 2 being depressed when it passes over radio beacon RB6. During this run and under no-wind conditions, as assumed, the rack 50 is moved up to establish a 1 to 1 radius ratio between cranks 41 and 42 and a 1 to 1 speed ratio between shafts 45 and 43, the same as heretofore, and the pointers 25 and 40 are moved to be spaced 15° instead of 7.5° apart.

Let us now assume that the operator at the control board of Fig. 3 calls, as by radio phone, the pilot of this airplane for a landing maneuver in the Fig. 12 pattern just as the airplane passes over point 170. The pilot will depress push button 3 upon being called and will depress push button 4 when he passes over radio beacon RB6. Since 1.5 minutes will be required to fly this distance the gears 15 and 17 (Fig. 4) will be coupled together for 1.5 minutes. During this time the gear 15 will rotate through an angle of 3.75° and the gear 17 will rotate clockwise through twice that angle or 7.5°. The pointers are therefore 7.5° apart representing a time interval of 1.5 minutes. Depressing of push botton 4 of course uncouples gear 17 from gear 15, the gear 17 being held in its then operated position by ratchet dog 108, and gear 39 is now coupled to bull gear 15 through the medium of pinions 31 and 32 (having pitch diameters in the ratio of 1 to 4). Gear 39 is now rotated clockwise at a speed of 20° per minute causing cranks 41 and 42 to rotate in a counter-clockwise direction at half that speed or 10° per minute. Since pointers 25 and 40 were only 7.5° when push button 4 was depressed these pointers will be over each other 7.5°/10° or 0.75 minute later. In other words, the out-time OT is 0.75 minute as it should be, in that stack-loss time of 1.5 minutes plus out-time of 0.75 minute, plus circle time of 1 minute plus in-time of 0.75 minute is equal to 4 minutes, which is the total maneuver time abve assumed to have been chosen.

*Fig. 12 operation (10 M. P. H. tail-wind condition).*—Let us now assume that an airplane stored in holding stack HS2 (Fig. 12) makes the usual ground speed determining run from a point 170 in the holding stack to radio beacon RB6 by depressing push buttons 1 and 2, push button 1 being depressed when the airplane passes over point 170 and push button 2 being depressed when it passes over radio beacon RB6. During this run and under 10 M. P. H. tail wind conditions, as assumed, the rack 50 is moved up to establish a 1 to 0.94 radius ratio between cranks 41 and 42 and a 0.94 to 1 speed ratio between shafts 45 and 43 and the pointers 25 and 40 are moved to be spaced 14.55° (.94×7.5° was added) instead of 7.5° apart. Let us now assume that the operator at the control board of Fig. 3 calls, as by radio phone, the pilot of this airplane for a landing maneuver just as the airplane passes over point 170. The pilot will depress push button 3 upon being called and will depress push button 4 when he passes over radio beacon RB6. Since 1.4 (ground speed now 145 M. P. H.) minutes will be required to fly this distance, from point 170 to beacon RB6, the gears 15 and 17 (Fig. 4) will be coupled together for 1.4 minutes. During this time the gear 15 will rotate through an angle of 3.5° and the gear 17 will rotate clockwise through twice that angle or 7°. The pointers are therefore 14.55° minus 7° or 7.55° apart representing a time interval of 1.51 minutes. Depression of push button 4 of course uncouples gear 17 from gear 15, the gear 17 being held in its then operated position by ratchet dog 108, and gear 39 is now coupled to bull gear 15 through the medium of pinions 31 and 32 having pitch diameters in the ratio 1 to 4. Gear 39 is now rotated clockwise at a speed of 20° per minute causing crank 41 to rotate in a counter-clockwise direction at half that speed or 10° per minute, and causing crank 42 to rotate at 10° divided by 0.94 or 10.6° per minute. Since pointers 25 and 40 were only 7.55° apart when push button 4 was depressed these pointers will be over each other 7.55°/10.6 or 0.71 minute later. In other words, the out-time OT is 0.71 minute which is substantially what it should be, in that stack-loss time of 1.4 minutes plus out-time of 0.71 minute, plus semi-circle time of 1 minute plus semi-circle drift time of 0.091 plus in-time of 0.71 times 145/125 or 0.825 minute is equal to 4.026 minutes, which is substantially the total maneuver time above assumed to have been chosen. The error, it will be seen, is only 0.026 minute.

Figure 13:
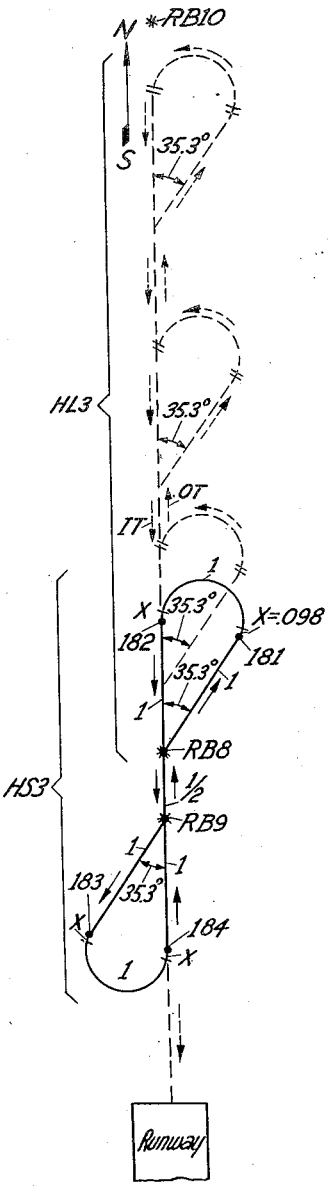
Fig. 13 illustrates another form of flying pattern in connection with which the computer illustrated in Figs. 4 and 5 (slightly modified) may be used.

*Modified pattern—Fig. 13 and computer therefor.*—In Fig. 13 has been illustrated a flying pattern in which an airplane may, to consume time, fly back and forth over a straight stretch and when it reaches the end thereof it may turn, preferably in a right-hand direction, at an angle of substantially 35.3° then continue to fly for one minute in that direction after which a left-hand semi-circular procedure turn may be made turning at the rate of 3° per second and when the airplane again reaches said straight line it may proceed back thereover to the point at the other end where a similar procedure turn may be made. A flying pattern of this kind has been illustrated in Fig. 13 by solid lines and this flying pattern when of a length as illustrated by solid lines constitutes the holding stack. The entire flying pattern is the same as just described except for the length of the straight run between points where the pilot turns at substantially 35.3° to the right, in that this length is varied as determined by the computer illustrated in Fig. 4 when modified to be used with the flying pattern of Fig. 13. As just pointed out specific distances expressed in time have been assigned to different parts of the flying pattern illustrated in Fig. 13. It should, however, be understood that the invention is not limited to these specific distance assignments expressed in time, in that they have been used only to aid in the disclosure of the invention and to illustrate how the modified computer to be used with this Fig. 13 flying pattern is capable of informing the pilot when he is to start a procedural turn. As specifically illustrated in Fig. 13 the straight line portion common to the two procedural turns in the holding stack HS3 is one-half minute flying time distance and the ends of this straight line have been defined by radio beacons RB8 and RB9, the direction of flight in the holding stack being indicated by solid arrows whereas dotted arrows illustrate the direction of flight in the holding loop. Several holding loops HL3 have been illustrated to signify that the dotted holding loop may be displaced any distance from the radio beacon RB8, the particular distance depending upon the particular stack-loss time consumed in a particular landing maneuver.

By a study of the holding stack HS3 and the distance in time assigned to the various elements thereof, it is readily seen that the total holding stack time is 7+4X minutes where X, for reasons heretofore given, represents 0.098 minute making a total holding-stack time of 7.392 minutes. A portion of the holding stack HS3 is at times used for holding loop purposes and for this reason the location of radio beacon RB8 is taken as the exit point for northward flying out of the holding stack and also as the starting point of the holding stack and this same location is also used to signify when a southwardly flying plane upon termination of its landing maneuver has reached a landing location for its flight toward the runway. In order to aid in the description of flying pattern of this modified form of the invention four other points in the holding stack have been designated 181, 182, 183 and 184 respectively. It is readily seen that if an airplane has just passed radio beacon RB8 in flying toward point 181 it can no longer follow the straight line toward radio beacon RB10 and neither can it follow such line until the airplane has completed the entire holding stack maneuver from radio beacon RB8 through points 181, 182, radio beacons RB8 and RB9, point 183, point 184, radio beacons RB9, back to the starting point of the holding stack at radio beacon RB8. In other words, the maximum stack-loss time is equal to the holding stack maneuver time of 7.392 minutes. It is also readily seen that if such airplane were at the radio beacon RB9 and flying in a northward direction when the airplane under consideration is called from the holding stack for a landing maneuver that the pilot is lined up to continue his straight line flight toward radio beacon RB10 and for this reason he may leave the holding stack when he reaches radio beacon RB8. In other words, in this case the pilot would depress the push button 3 of a modified computer, similar to that described in connection with Fig. 12, and would depress the push button 4 when he passes over radio beacon RB8 in which case his stack-loss time would be 0.5 minute and one-half of the unused stack-loss time could be used up in a straight line flight toward radio beacon RB10. With this understanding of the flying pattern of Fig. 13 let us observe what modifications must be made to the computer specifically illustrated in Fig. 4 of the drawings in order that such computer may be used with the flying pattern illustrated in Fig. 13 for computing out-time.

The computer illustrated in Fig. 4 when modified to be used with the flying pattern illustrated in Fig. 13 either omits or disregards all of the heading angle features of the computer illustrated in Fig. 4 so that the drift knob 110 if retained will be placed in its 0 position and the pointer 75 will be either disregarded or entirely omitted from the structure. The only other changes that will be made in the structure is that the ratio of pitch diameter of pinion 31 to pinion 32 will be as 1 is to 4, that the pitch diameter ratio of pinion 57 is to gear 58 as 1 is to 24 and with the stack-loss pointer 25 and the out-time pointer 40 spaced normally apart a distance of 29.46° which is increased to 36.96° after a ground speed determining run under no-wind conditions has been made. This latter angle 36.96° between pointers 25 and 40 represents the total time in the computer, which is the same as the total time in the holding stack, which is 7.392 minutes. The entire landing maneuver run is, however, longer than the total time in the computer to the extent of a complete procedural turn, namely, a turn such as one starting at radio beacon RB8 and extending over points 181 and 182 and returning back to radio beacon RB8, and this is 3.196 minutes making a total maneuver time of 10.588 minutes.

*Operation—employing flying pattern of Fig. 13 (no-wind condition and stack-loss time equals 0).*—Let us assume that an airplane is flying in the direction of the solid arrows in the holding stack HS3 illustrated in Fig. 13 and that the pilot wishes to determine the drift angle for which he must compensate and that he also wants to make manifest in the computer the ground speed of the airplane assuming an air speed of 135 M. P. H. the same as heretofore. The drift angle will be determined in a manner as already pointed out and when known will be taken into consideration during the remainder of the landing maneuver. As the airplane passes over the radio beacon RB9 when flying in the northward direction he depresses the push button 1 and thereby couples the gear 55 (Fig. 4) to the bull gear 15 through the medium of pinion 57 and gear 58 which are now assumed to have a pitch diameter ratio of 1 to 24. This will cause the gear 55 to rotate 48 times as fast as the bull gear 15, or in other words, causes the gear 55 to rotate 60° during one-half minute operation of the bull gear 15, as during the time the airplane flies from radio beacon RB9 to radio beacon RB8 remembering that there is neither a head wind nor a tail wind under the conditions assumed. Since the pitch circumference of the gear 55 is 6 inches, its diameter being assumed to be 1.94 inches the rack 50 is moved upwardly exactly one inch to cause the radius ratio of crank 41 to that of crank 42 to be as 1 is to 1. Also, for reasons hereinbefore described the cranks 41 and 42 will be operated 7.5° in a clockwise direction and from the solid line position of these cranks to their dotted line position. The pointers 25 and 40 are now 36.96° apart whereas under initial conditions they were only 29.46° apart.

Let us now assume that the airplane continues to fly in the holding stack HS3, shown by solid lines in Fig. 13, to hold itself aloft and that the operator, located in a suitable tower and provided with a control board such as illustrated in Fig. 3, calls the airplane under consideration for a landing maneuver just as this airplane is flying northwardly over the radio beacon RB8 and is pointing his airplane toward beacon RB10. This is a situation where the stack-loss time is 0 and therefore the operator need not depress the push button 3 at all but may immediately depress the push button 4. Depression of the push button 4 causes the pinions 31 and 32 to engage pinions 15 and 39 respectively to thereby cause rotation of the out-time pointer 40. Since the stack-loss pointer 25 and the out-time pointer 40 are still 36.96° apart the annulus A1 will have to rotate through an angle of 36.96° before these pointers 25 and 40 come into perfect registration with each other. In other words, the gear 39 will be required to rotate through twice this angle or through an angle of 73.92° and since the gear ratio between bull gear 15 and gear 39 is 1 to 8 the bull gear 15 will have to operate through an angle of 9.24° and dividing this by 2.5 we have 3.696 minutes for the out-time OT, namely, the time which the pilot consumes during his northward flying toward radio beacon RB10 before starting a procedural turn. At this point the pilot must bear to the right at an angle of substantially 35.3° to make this procedural turn. This value 3.696 minutes, which is exactly one-half of the total stack-maneuver time, is the correct value for out-time, in that this same amount of time must be reserved for in-time (IT) maneuver purposes to allow the pilot to get back to the radio beacon RB8 at the end of his landing maneuver time of 10.588 minutes. It is readily seen that 3.196 (10.588−7.392) is left and this additional 3.196 minutes time is required for him to make his procedural turn which was left out of the computer. In other words, when the pointers 25 and 40 get into registration with each other the pilot is located 3.696 minutes distance north of beacon RB8 and turns his airplane to the right at substantially an angle of 35.3°, flies out a distance of 1 minute, expressed in time, and then makes a left-hand 3° per second turn until he reaches the straight line run through beacons RB8, RB9 and RB10 which semi-circular turn will require substantially 1.196 minutes and he will then have left 4.696 minutes to reach the radio beacon RB8 which is the landing position which he is to reach exactly 10.588 minutes after he was called from the holding stack as will be the case for the particular landing maneuver just considered. In other words, he flies north from beacon RB8 a distance of 3.696 minutes (OT), flies 35.3 toward right a distance of 1 minute, turns left for 1.196 minutes, flies southward a distance of 1 minute, to complete his procedural turn, and then continues in that straight line another 3.696 minutes (IT) making a total of 10.588 minutes.

*Operation—employing flying pattern of Fig. 13 (no-wind condition and maximum stack-loss time of 7.392 minutes).*—Had the airplane already made its right-hand turn flying north over beacon RB8 when it was called for a landing maneuver the pilot would have depressed push button 3 and made another complete round in the holding stack HS3 and the pointers 25 and 40 would have been exactly coincident when he passed over this beacon northwardly the second time. He would then have made his holding loop procedural turn which would have been entirely in solid line (holding stack), and he would have flown southward over beacon RB8 3.196 minutes later at exactly the end of the total maneuver time of 10.588 minutes.

*Operation—employing flying pattern of Fig. 13 (no-wind condition and stack-loss time equals 3.696 minutes).*—Let us now assume that an airplane is flying in the direction of the solid arrows in the holding stack HS3 illustrated in Fig. 13 and that the pilot wishes to determine the drift angle for which he must compensate and that he also wants to make manifest in the computer the ground speed of the airplane assuming an air speed of 135 M. P. H. the same as heretofore. The pilot will proceed in a manner as described above.

For reasons above given the pointers 25 and 40 are now 36.96° apart whereas under initial conditions they were only 29.46° apart and a 1 to 1 radius ratio exists between cranks 41 and 42.

Let us now assume that the airplane continues to fly in the holding stack HS3 to hold itself aloft and that the operator, located in a suitable tower and provided with a control board such as illustrated in Fig. 3, calls the airplane under consideration for a landing maneuver just as this airplane is flying southwardly over the radio beacon RB9. This is a situation where the stack-loss time is 3.696 minutes, namely, a complete turn requiring 3.196 minutes and a northwardly run of 0.5 minute. The pilot depresses the push button 3 as he flies south-westwardly over beacon RB9 and then depresses the push button 4 as he flies northwardly over beacon RB8. Depression of the push button 3 causes the pinions 19 and 20 to engage gears 15 and 17 respectively to thereby cause the gear 17 to be rotated during a total period of 3.696 minutes before push button 4 is depressed when flying northwardly over beacon RB8. Since gear 17 is driven at a speed of 5° per minute the stack-loss time pointer 25 will be rotated clockwise through an angle of 18.48° (3.696×5°) leaving the pointers 25 and 40 only 18.48° (36.96°—18.48°) apart. The depression of push button 4 in addition to uncoupling stack-loss time gear 17 from bull gear 15 also couples bull gear 15 to out-time gear 39. Since gear 39 is driven at a speed of 20° per minute and shaft 45 is driven at half that speed or at 10° per minute the out-time OT (when pointers 25 and 40 are in registration with each other) is 1.848 (18.48/10) minutes, at which point during northward flying beyond beacon RB8 the pilot will start his procedural turn by flying toward right at an angle of substantially 35.3°. In other words, when the pointers 25 and 40 get into registration with each other the pilot turns his airplane to the right at substantially an angle of 35.3°, assuming zero side drift, and flies out a distance, expressed in time, of 1 minute and then makes a left-hand 3° per second turn until he reaches the straight line run through beacons RB8, RB9 and RB10 which semi-circular turn will require substantially 1.196 minutes and he will then fly back along the flight line for 1 minute to complete his turn time after which he will have used up an SLT time of 3.696+OT of 1.848+turn time of 3.196 or 9.240 minutes leaving him a balance of 10.588—9.24 or 1.848 (in-time) to reach the radio beacon RB8 which is the landing position which he is to reach exactly 10.588 minutes after he was called from the holding stack. Since the in-time left is the same as the out-time computed by the computer it is evident that the computer is performing its functions properly.

*Operation—employing flying pattern of Fig. 13 (10 M. P. H. tail-wind condition and stack-loss time equals .465 minute.*—Let us now assume that an airplane is flying in the direction of the solid arrows in the holding stack HS3 illustrated in Fig. 13 and that the pilot wishes to determine the drift angle for which he must compensate and that he also wants to make manifest in the computer the ground speed of the airplane assuming an air speed of 135 M. P. H. the same as heretofore. As the airplane passes over the radio beacon RB9, when flying in the northward direction, the pilot depresses the push button 1 and thereby couples the gear 55 (Fig. 4) to the bull gear 15 through the medium of pinion 57 and gear 58 which are now assumed to have a pitch diameter ratio of 1 to 24. This will cause the gear 55 to rotate 48 times as fast as the bull gear 15, or in other words, causes the gear 55 to rotate 56.12° during 0.466 minute operation of the bull gear 15 during the time the airplane flies from radio beacon RB9 to radio beacon RB8 remembering that there is a tail wind of 10 M. P. H. under the conditions assumed. Since the pitch circumference of the gear 55 is 6 inches, its diameter being assumed to be 1.94 inches the rack 50 is moved upwardly substantially 0.931 inch to cause the radius ratio of crank 41 to that of crank 42 to be as 1 is to 0.931. Also, for reasons hereinbefore described the cranks 41 and 42 will have operated 7° in a clockwise direction and from the solid line position of these cranks to within 0.5° of their dotted line position. The pointers 25 and 40 are now 36.46° apart whereas under normal conditions they were only 29.46° apart.

Let us now assume that the airplane continues to fly in the holding stack HS3 to hold itself aloft and that the operator located in a suitable tower and provided with a control board such as illustrated in Fig. 3 calls the airplane under consideration from the holding stack for a landing maneuver just as this airplane is flying northwardly over the radio beacon RB9. The pilot as he passes over beacon RB9 depresses the push button 3 and as he passes over beacon RB8 he depresses the push button 4. Depression of the push button 3 causes stack-loss time gear 17 to be driven by bull gear 15 and at a speed twice that of bull gear 15 namely at a speed of 5° per minute, and depression of push button 4 causes the pinions 19 and 20 to be disengaged and cause pinions 31 and 32 to engage gears 15 and 39 respectively to thereby cause rotation of the out-time pointer 40. Since the stack-loss pointer 25 and the out-time pointer 40 were 36.46° apart, after ground speed determination had been completed and since a stack-loss time of 0.465 minute was consumed in flying from beacon RB9 to RB8 during which time pointer 25 rotated clockwise 0.465×5° or 2.325° these pointers are now spaced 33.135° apart. The annulus A1 will, however, have to rotate only through an angle of 30.85° before these pointers 25 and 40 come into perfect registration with each other because the radius ratio of cranks 41 and 42 is as 1 is to 0.931. In other words, the gear 39 will be required to rotate through twice this angle or through an angle of 61.70° and since the gear ratio between bull gear 15 and gear 39 is 1 to 8 the bull gear 15 will have to operate through an angle of 7.71° and dividing this by 2.5 we have 3.08 minutes for the out-time, at the end of which time the pilot, during his northward flying toward radio beacon RB10, must bear to the right substantially 35.3° to make his procedural turn.

Let us see how closely this checks, remembering that the stack-loss time SLT was 0.465 minute and the out-time OT was 3.08 minutes, since during out-time the tail wind aids and during in-time it becomes a head wind the in-time is 145/125 times the out-time or 3.58 minutes. The turn time is 3.196 minutes and the additional time required to fly back the distance the airplane drifted during circling was assumed to be .091 minute. Subtracting the sum of these times of 10.412 minutes from the total maneuver time of 10.588 we have an error of 0.176 minute which is small if the large maneuver time is taken into consideration.

*Modified computer structure—Figs. 14–18.*—In Figs. 14–18 has been illustrated a modified computer which for convenience may be called a "turnometer" and which is used in connection with a circular holding stack of a fixed circumference expressed in time and of which, in the particular construction shown although other arrangements may be used, the holding loop comprises a circular loop having a circumference at least as large as that of the holding stack and under certain extreme conditions, namely, when the stack-loss time is zero has twice that circumference.

The face or dial side of this computer has been illustrated in Fig. 14. The dial is provided with a fixed direction or compass rose 200—201 with the east and west markings E and W and the azimuth numbers in reverse rotation thereon, having a gyrocompass repeating needle 202, a direction-of-wind index or pointer 203 which is readable on the rose 200—201, a time lapse operated index or pointer 204 operated by suitable time indicating means and a rate-of-turn indicator dial 206 which indicates the speed of rotation of the time indicator 204 in degrees per second. The reason for having the direction letters E and W and the azimuth numbers in reverse order on the rose 200—201 is to get the compass needle to point at the direction of wind pointer 203 when the airplane is headed into the wind, and to have the compass needle indicate the actual direction in which the airplane is heading. The face of this computer is also provided with a push button PB, a turn-knob 210 for rotating the wind direction ring 235 containing the index or pointer 203, and a turn-knob 211 for rotating the rate-of-turn indicating dial 206 and in so doing rotating a gear frame 220—221 coupling the pointer 204 to a suitable timing device including any one of various gear trains having different gear ratios and all driven by a common bull gear 218.

Refer now to Fig. 15 of the drawings which shows a side view of the computer, partly in cross section, of which the front part of the casing comprises a front plate 215 including a cover glass 216 and the housing part of which includes the casing 217. In the rear end of this casing 217 is mounted a suitable timing motor M2 which through reduction gearing (not shown) contained within its housing drives bull gear 218 through the medium of a shaft 219. This shaft 219 pivotally supports the rotatable gear frame or gear works comprising a back gear plate 220 and a front circular plate 221 (partly broken away in Fig. 16) both of which are pivotally mounted on the shaft 219. This gear works 220—221 includes any desired number of separate gear trains radiating out from the bull gear 218, thirteen having been shown, terminating in individual drive pinions $225^1$ to $225^{13}$, inclusive. Each of these pinions $225^1$–$225^{13}$ is directly gear connected to the bull gear 218 and all of these pinions $225^1$–$225^{13}$ operate at different speeds. As an example, although other gear speeds may be used, we may assume that pinion $225^{12}$ is directly connected to the bull gear 218 through the medium of idler 222, whereas the tooth speed of pinion $225^{13}$ is higher and the tooth speeds of all other pinions $225^1$–$225^{11}$, inclusive, are lower than that of pinion $225^{12}$. For instance, if desired, these various tooth speeds may be such that pinions $225^1$, $225^2$, $225^3$, $225^4$, $225^5$, $225^6$, $225^7$, $225^8$, $225^9$, $225^{10}$, $225^{11}$, $225^{12}$ and $225^{13}$ drive gear 234 and pointer 204 at speeds of 0.25, 0.27, 0.291, 0.312, 0.333, 0.354, 0.375, 0.396, 0.417, 0.438, 0.459, 0.479 and 0.5 R. P. M., respectively, resulting in rate-of-turn in degrees per second of 1.5, 1.625, 1.75, 1.875, 2.00, 2.125, 2.25, 2.375, 2.5, 2.625, 2.75, 2.875 and 3 degrees per second, respectively, resulting in minutes per revolution of pointer 204 of approximately 4, 3.69, 3.43, 3.2, 3, 2.82, 2.66, 2.5, 2.4, 2.28, 2.18, 2.08 and 2, respectively.

In the top of the housing 217 is pivotally supported a shaft 230 supported, as for instance, by bearings 231 and containing pinions 232 and 233. The pinion 232 is so located that it may be engaged by any one of the pinions $225^1$ to $225^{13}$, inclusive, one at a time, whereas the pinion 233 at all times engages the gear 234 which supports the pointer 204. In other words, the pointer 204 may be driven clockwise by the bull gear 218 through the medium of any one of 13 different gear ratio gear trains, in the specific embodiment of the invention shown, depending upon the position assumed by the gear frame including back plate 220 which also constitutes a gear, which gear 220 is in continuous mesh with the pinion 212 directly connected to rotary knob 211 through the medium of shaft 213. The pitch diameter ratio between this pinion 212 and the back plate gear 220 is preferably 1 to 13 so that one complete revolution of the knob 211 will cause the back plate gear 220 to be rotated 1/13 of a revolution and this knob 211 is preferably provided with a suitable detent including a notch into which notch in the knob 211 the spring 214 may enter, so that this knob 211 may be locked in any one of 13 different positions of the back plate gear 220. The wind direction pointer 203 is directly secured to a ring gear 235, which ring gear is pivoted by idlers 228 and 229 and may be turned to any one of various positions through the medium of the pinion 236 connected to the rotary knob 219 through the medium of a shaft 237. In other words, rotation of the rotary knob 210 causes rotation of the ring gear 235 and the pointer 203. Not only does rotation of the knob 211 rotate the gear works 220—221 but it also, as by pinion 240, rotates the ring dial 206, pivoted by idlers 241 and 241¹, on which the rate-of-turn in degrees per second is visible through an opening in the front plate 215 of the computer. The dial 201 and gear 234 are supported by hub 238 of the motor 242.

The repeater compass needle 202 is preferably operated by a gyrocompass repeater motor 242, as through the medium of a shaft 243, so that this pointer 202 points to N on the compass rose when the airplane points due north and rotates to the right when the airplane turns toward the left (in modification below the direction of rotation is reversed). As a result of this construction orientation of the airplane with respect to due north causes the direction of nosing of the airplane to be indicated by reading the pointer 202 on the compass rose 200—201. This repeater motor 242, which is preferably a motor unit of a Selsyn motor combination, is of course controlled by a suitable gyroscopic or other form of compass. If desired the direction of rotation of bull gear 218 and the direction of rotation of compass repeating motor 242 may be reversed, in which event the azimuth degrees and the E and W markings will be in the opposite direction about the rose 200—201 from that shown, namely, will be placed thereon as on an ordinary compass. In this case too the compass needle will point in the direction on the dial in which the airplane is heading. Such a modified compass rose has been shown in Fig. 14A. The synchronous motor M2, or other electric motor having good timekeeping qualities, is preferably controlled through the medium of two sets of contacts, namely, through the medium of push button contacts 244 and 245 controlled by the push button PB and through the medium of contacts 246 and 247 which are closed at all times except when pointers 203 and 204 are in registration. The contacts 246—247 may for instance be supported by gear 234, suitable slip ring connections being provided, and in insulating block 239 may be supported by ring gear 235 so that these contacts are open, as shown, when insulation 239 and contact 247 get into registration, namely, when pointers 203 and 204 are in agreement. In other words, if the push button PB is depressed to thereby cause rotation of the pointer 204 to bring it out of registration with pointer 203 a stick circuit for the motor M2 is closed which remains closed until the pointer 204 has made a complete revolution and has again been brought into correspondence with pointer 203 and when this occurs the contacts 246—247 open to stop the motor M2. The motor M2 can only be restarted by either manually rotating the pointer 203, as through the medium of knob 210, or by momentarily depressing the push button PB.

Figure 19:
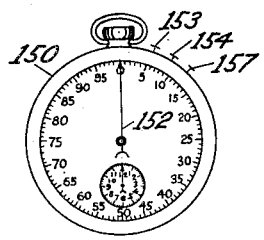

In Fig. 19 has been shown a stopwatch contemplated being used on the airplane as part of the computer or turnometer shown in Fig. 15. This stopwatch is similar to the one shown in Fig. 3 but is provided with separate start, stop and reset buttons 153, 154 and 157 respectively instead of the single button performing all three functions used in the stopwatch shown in Fig. 3.

To get a better understanding of the computer illustrated in Figs. 14 and 15 attention is directed to the sectional elevations thereof illustrated in Figs. 16, 17, and 18.

Figure 20:
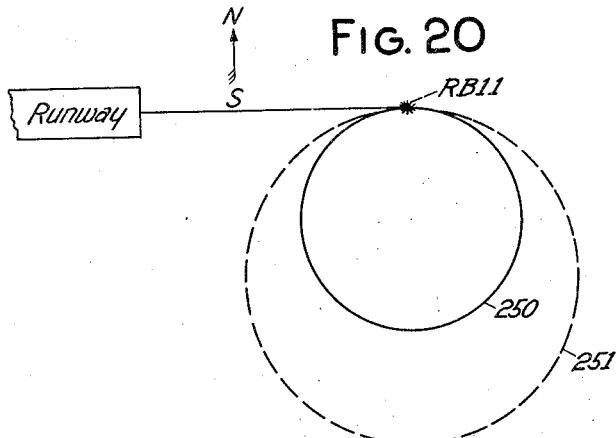
Figs. 20 and 21 illustrate the flying patterns under no-wind and head-wind conditions respectively, used in connection with the computer apparatus shown in Figs. 14–19.
Figure 21:
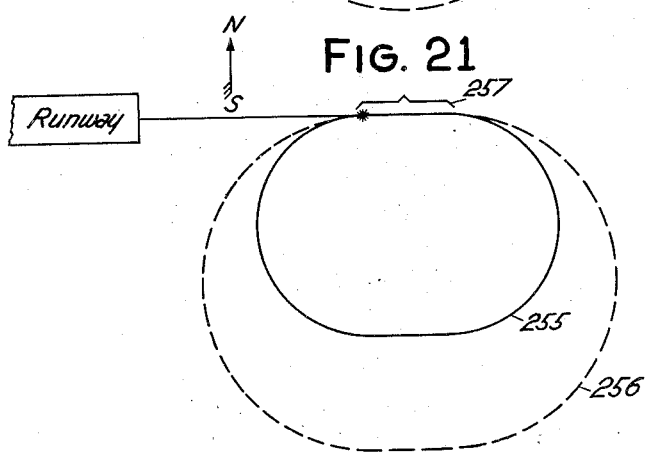
Figure 22:
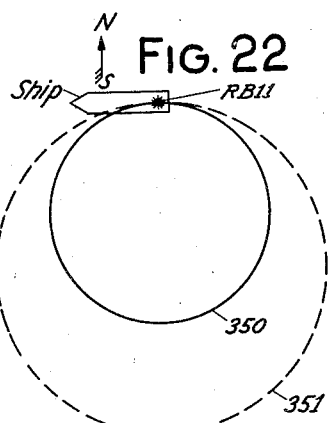
Fig. 22 illustrates the application of the computer of Figs. 14–19 to the landing of airplanes on an airplane carrier.

*Operation of computer (Figs. 14–18)*.—As illustrated in Figs. 20, 21 and 22 the circular flying pattern contemplated being used with the computer illustrated in Figs. 14–18 employs only a single radio beacon. This lends this modified system particularly to the landing of airplanes on airplane carriers as more fully pointed out hereinafter and as illustrated in Fig. 22.

In Fig. 20 has been illustrated the physical shape of the flying pattern, under no-wind conditions, of which the inner circle 250 constitutes the holding stack and the outer circle 251 constitutes one of the many possible holding loops. In accordance with the present invention when practiced on land, or with the radio beacon RB11 mounted on an airplane carrier as illustrated in Fig. 22, it is contemplated to be so practiced that only head winds and no wind at all will be encountered. As shown in Fig. 21 head winds merely draw out the circles 250 and 251 of Fig. 20 into ovals or oblong paths 255 and 256 respectively as illustrated in Fig. 21 and the net result is that the total time of the flying pattern is increased in that the straight line run just before reaching the radio beacon is increased as the head wind increases. The time spacing of airplane landings is, however, not increased although the total time of a landing maneuver is increased. In Fig. 22 the two circles have been designated by reference numerals 350 and 351.

Let us assume that under no-wind condition and with the runway toward the west, as shown in Fig. 20, an airplane is being stored in the holding stack 250. The operator or dispatcher who is provided with a control board such as illustrated in Fig. 3 informs the various pilots as to the heading of the runway, namely, due west. The pilots will each in response to this information turn the knob 210 of his turnometer until index 203 points to the W on the compass rose. The pilot will then attempt to fly over radio beacon RB11 in a westwardly direction with his rate-of-turn dial 206 indicating 3.00 and with the pinion 225¹³ engaging pinion 232, as illustrated in Fig. 16. Each pilot will so steer his airplane that the compass needle 202 will line up with the index 204 which is rotated at a speed of 0.5 R. P. M. (clockwise in Fig. 14 and counter-clockwise in Fig. 14A) and each pilot will also depress push button PB each time he passes over radio beacon RB11 and this occurs simultaneously with the movement of pointers 202 and 204 by index 203. When he first turned index 203 to the W position on the compass rose and as he continued his flight the index 204 stopped when it reached the W (west) position because contacts 246–247 opened and stopped the synchronous motor M2. This would of course happen just as the airplane pointed at the runway. If it did not he could, and would, make a slight correction in the position assumed by index 203. His depression of push button PB at the completion of each turn would cause the motor M2 to restart just as he passed over the radio beacon RB11 and since he was then flying westwardly and his compass needle 202 was pointing to the north it also pointed directly to W on dial 200—201 and also to the index 203. If the pilot now keeps the compass needle 202 on the index 204 he will fly a circle having a curvature of 3 degrees per second, namely, a circular path having a two minute circumference. This is true because with dial 206 adjusted to indicate 3.00 per second the gear train, including gear $225^{13}$, will rotate pointer 204 at exactly 0.5 R. P. M. Each pilot continues to store his airplane at the proper altitude assigned to him and each time an airplane passes over radio beacon RB11 the pilot thereof will depress his push button PB.

Let us now assume that the operator calls the pilot of a particular airplane for a landing maneuver as the airplane he is flying is in the holding stack 250 and just as it is exactly diametrically opposite the radio beacon RB11 in this stack 250. The pilot continues his flight by keeping pointer 204 and compass needle 202 together whereas the operator starts a suitable timing device such as the stop watch 150 shown in Fig. 3. As the airplane passes first points directly at radio beacon RB11 the pilot reports this event to the operator who immediately informs the pilot which rate-per-turn indication he shall display by his dial 206. In this case the operator will tell the pilot to set his knob 211 until dial 206 indicates 2.00, meaning 2° per second, which the pilot will do and in so doing will select the gear train including pinion $225^5$. With gear 234 coupled to bull gear 218 through the medium of gear $225^5$ the index 204 will rotate at a speed of one revolution in three minutes so that as the pilot keeps compass needle 202 with index 204 he will consume exactly 3 minutes in completing his circular turn in holding loop 251. The total time consumed between the calling of the airplane for a landing maneuver and its second heading toward radio beacon RB11 is therefore 4 minutes. Under no-wind condition the airplane will be directly over the radio beacon when his circular turn has been completed. Had there been a head wind the pilot would have continued to head toward radio beacon RB11 by flying a straight line path such as shown at 257 in Fig. 21 during which time both the indicator 204 and compass needle 202 would have remained at rest. The compass needle would have remained at rest because the airplane was flying in a straight line (due west) and the index 204 would have remained stationary because the circle time would have run out, stopping motor M2 by opening of contacts 246—247, and the pilot would not yet have depressed push button PB because he would not yet have reached the radio beacon RB11.

The timing device mentioned as having been used by the operator to determine the rate-of-turn indication on dial 206, and the gear ratio to be selected, may be any suitable stack-loss measuring instrument which is calibrated to indicate rate-of-turn instead of stack-loss time. In fact, if desired, the pilot may himself use a stop watch, such as shown in Fig. 19, of which he starts the timing hand 152 by depressing button 153 when he is called by an operator for a landing maneuver. The pilot stops the timing hand as by depressing stop button 154 when the indexes 203 and 204 get into registration. The timing hand 152 may then be returned to its zero position by depression of the reset button 157 so as to return the stop watch to its normal condition for later use. This stop watch instead of being calibrated in time (stack-loss) may be calibrated in rate-of-turn to be consumed in the holding loop and the pilot may then set knob 211 in accordance with the rate-of-turn indicated by the stop watch upon completion of the holding stack circle. In this way a certain amount of radio communication may be avoided to in turn allow more radio communication time for the laddering of airplanes from altitude to altitude in the holding stack.

Had the airplane just barely passed the radio beacon RB11 when it was called for a landing maneuver, instead of being located diagonally opposite as above assumed, the stack-loss time would have been two minutes instead of one and in this case the holding time would also have been two minutes instead of three, so that in this case the dial 206 would not have been changed from its 3° per second position and the holding loop would have had the same circumference (2 minute flying time) as the holding stack. Had the pilot been called just before, say 0.31 minute before he passed the radio beacon the stack-loss time would have been 0.31 minute and in this event the holding loop time would have been 3.69 minutes in which event the stop watch would have advised the pilot that he must turn dial 206 to indicate rate-of-turn 1.625 per second and in this case the gear train including pinion $225^2$ would have been brought into play.

Let us elaborate a little farther. Let us assume that the pilot has a stop watch that is calibrated with two sets of numbers (1) in minutes starting with 4 and ending with 2 and (2) in degrees per second starting with 1.5° per second and ending with 3° per second (see relationships between these values above). If now the operator calls the pilot for a landing maneuver he will depress button 153 and start the time hand of his stop watch and when he completes his turn he will depress button 154 and stop the time hand. His stop watch will now no longer indicate stack-loss time but will instead indicate 4 minus holding loop time and will also indicate the degrees per minute rate-of-turn to consume this holding loop time. The pilot may then turn knob 211 until it indicates the 1.5 degree-per-second rate-of-turn time indicated on his stop watch.

If desired, the dial 206 may be calibrated in holding-loop time in which case the degrees-per-minute scale may be entirely omitted from the stop watch. Also, if desired the dial 206 may be calibrated in stack-loss time in which event an ordinary stop watch may be used. In this case the minute markings on the stop watch dial start with zero it being assumed that the stop watch time hand rotates, say, one revolution in five minutes. In this case the pilot will measure the stack-loss time and set the knob 211 to indicate this stack-loss time. This will select the proper gear ratio to cause the pilot to fly a holding circle, by keeping pointers 202 and 204 together, of a circumference that will consume the time that is left after the stack-loss time has been subtracted from 4 for the specific construction assumed.

From the foregoing it is readily understood that the turnometer (Figs. 14–18) is particularly applicable to airplanes which are to land on an airplane carrier. It is well known that airplane carriers, when airplanes are to land thereon, are always headed into the wind for two reasons. An airplane carrier is headed into the wind in order to reduce the minimum landing speed and secondly, an airplane carrier is kept moving when an airplane is to land thereon in order to lengthen, so to speak, the runway afforded by such carrier in that every foot that the carrier moves forward with a landed airplane having its landing wheels in contact therewith increases the effective length of the runway to that extent. In other words, airplane carriers are always moving and are headed into the wind when an airplane is to land thereon. For this reason the landing scheme described in connection with Figs. 14–18 is particularly adaptable to airplane carriers and the landing procedure is exactly the same as the heretofore described procedure the only difference being that the extent of the head wind is the sum of the wind itself added to the speed of the airplane carrier. For these various reasons it is believed unnecessary to specifically describe how an airplane may be landed on an airplane carrier by the employment of the turn-airplane carrier by the employment of the turn-ometer described in connection with either a timer in the hands of the operator or a stop watch in the hands of the pilot as above described. It is of course understood that airplanes are called in succession at time spaced intervals equal to that of the intervals at which it is desired to land airplanes on either a runway or on an airplane carrier, as above described, the time spacing being considerably less than the maneuver time so that airplanes are landed in overlapped relationship.

Having thus shown and described several embodiments of the present invention it is desired to be understood that the specific computers shown and described, and certain modifications thereof, which have been described only, have been selected for the purpose of facilitating the description of the underlying principles of the invention rather than its scope, or the specific construction preferably employed in practicing the invention, and it should be understood that various other designs and constructions as well as additions or modifications may be made, where required, to meet the situations encountered in practicing the invention, all without departing from the spirit or scope of the invention except as demanded by the scope of the following claims.

What we claim as new is:

1. A computer for computing the time an airplane shall fly in a predetermined direction in a holding loop dependent upon the time lost in a holding stack since a landing maneuver was started by such airplane comprising, two rotatable indicator arms operable about the same axis and located a predetermined number of degrees apart, means for driving one indicator arm at a predetermined speed toward the other indicator arm from the start of a landing maneuver until the airplane leaves a holding stack, and means effective thereafter for driving the other indicator arm at a predetermined different speed and toward said one indicator from the time the airplane leaves said holding stack, the time of performing a predetermined act being indicated by the meeting of said indicator arms at the same angular position on said axis.

2. A computer for computing the direction of heading into a holding loop and the time the airplane is to fly in that direction before making its return trip in the loop comprising, a stack-loss time indicator, a heading angle indicator, an out-time indicator, means rotated in accordance with the elapse of stack-loss time to operate both said stack-loss indicator and said heading angle indicator, and other means associated with said stack-loss time indicator and rotated at a different and higher speed and in the opposite direction to operate said out-time indicator in the opposite direction to the direction of operation of said stack-loss time indicator until said out-time indicator has consumed the distance remaining between them to thereby measure the remaining time during which the airplane is to move in the heading direction in the holding loop.

3. Airplane carried apparatus for aiding the pilots of successive airplanes in making substantially equal time consuming landing maneuvers which terminate at substantially the same point in space after having been called from a holding stack by a tower operator irrespective of the locations of the airplanes in a holding stack at the instant each airplane is called comprising, timing means including a first rotatable pointer having a normal position, means for initiating the timing means when the airplane is called for a landing maneuver, means for stopping said timing means when the pilot leaves the holding stack as a result of which the stack-loss time has been measured, and other timing means located on the airplane and including another rotatable pointer operated at substantially twice the rate of operation of said first rotatable pointer for informing the pilot how long he is to fly the out-course in his flying maneuver in a holding loop to arrive at a particular point in space at substantially a fixed time after he was called for a landing maneuver, said other timing means acting with respect to the time left from a predetermined time following the elapse of the stack-loss time measured by said first mentioned timing means.

4. An airplane carried apparatus for informing the pilot how to fly his airplane so as to conform to a flying pattern determined by such apparatus comprising, a time shaft, means including a stack-loss time pointer driven by said time shaft for measuring the time lost in a holding stack between the time the airplane started a landing maneuver and when it leaves the holding stack, said means being initiated by the pilot when he starts a landing maneuver and stopped by the pilot when his airplane leaves the holding stack, out-time means including a variable ratio driving connection time shaft for making manifest in said apparatus the ground speed of said airplane, and other means including a heading dial and pointer operated by said first time shaft in accordance with said stack-loss time, and an out-time pointer governed by the said out-time means in accordance with ground speed for informing the pilot as to the pattern he shall fly in a holding loop in order to arrive at a predetermined point a predetermined time after he started his landing maneuver.

5. In a computer for calculating the flight factors of an airplane, an out-time pointer rotatable about an axis, an electric motor operating at a constant speed, an operative mechanical connection between said motor and pointer including an epicyclic gear train, a variable ratio mechanical connection, and means at times operated by said motor for changing the ratio of said variable ratio connection and at the same time operating said pointer through said epicyclic gear train.

6. In a computer for calculating flight factors for airplane maneuvers, a pointer rotatable about an axis to indicate the elapse of time, a variable ratio mechanical connection to said pointer, said connection being capable of being set in different initial positions, an epicyclic gear train supplying power through said mechanical connection to said pointer from either of two driving in-puts, a constant speed source of power, manually controlled means for at times connecting said source of power to one of said in-puts, and other manually controlled means for at other times connecting said source of power to set said variable ratio mechanical connection in a selected initial position and at the same time to supply power to the other in-put of said epicyclic gear train to determine the initial position of said pointer.

7. In a computer for calculating the flight factors involved in airplane maneuvers with respect to a holding stack and a variable size holding loop, a rotatable stack-loss pointer, a rotatable out-time pointer constructed to be rotated about an axis common with said stack-loss pointer, said pointers being set a predetermined number of degrees apart, a shaft driven at a constant speed of rotation for driving said stack-loss pointer during the time lost by an airplane in said holding stack before it enters said holding loop, another shaft driven at a constant but higher speed of rotation after said airplane enters said holding loop, a variable ratio connection between said another shaft and said out-time pointer and constructed to cause its rotation in a direction opposite to the direction of rotation of said stack-loss pointer, and means manually governed for setting said variable ratio connection in accordance with the ground speed of the airplane, whereby said pointers assume corresponding positions to indicate the elapse of a particular calculated time.

OSCAR S. FIELD.
SEDGWICK N. WIGHT.
RALPH W. HEWES.

REFERENCES CITED

The following references are of record in the file of this patent:

UNITED STATES PATENTS

| Number | Name | Date |
|---|---|---|
| 1,282,553 | Eaton | Oct. 22, 1918 |
| 1,343,198 | Eaton | Jun. 15, 1920 |
| 1,407,134 | Eaton | Feb. 21, 1922 |
| 2,063,764 | Smith | Dec. 8, 1936 |
| 2,116,508 | Colvin | May 10, 1938 |
| 2,215,447 | Kollsman | Sept. 17, 1940 |
| 2,311,005 | Thurlow | Feb. 16, 1943 |
| 2,351,629 | Noxon | June 20, 1944 |
| 2,373,771 | Maxson | Apr. 17, 1945 |